United States Patent [19]
Kovar et al.

[11] Patent Number: 5,977,269
[45] Date of Patent: Nov. 2, 1999

[54] POLYESTER/VINYL DIOXOLANE BASED COATING COMPOSITIONS

[75] Inventors: Robert F. Kovar, Wrentham; William E. Dorogy, Jr., Hudson; Brian P. Farrell, Dorchester; Nelson Landrau, Marlborough, all of Mass.

[73] Assignee: Foster-Miller, Inc., Waltham, Mass.

[21] Appl. No.: 08/961,110

[22] Filed: Oct. 30, 1997

[51] Int. Cl.⁶ ........................................... C08F 4/44
[52] U.S. Cl. ........................ 526/148; 526/270; 528/276; 528/277; 525/284; 524/601
[58] Field of Search ..................................... 526/270, 148; 525/284; 528/277

[56] References Cited

U.S. PATENT DOCUMENTS

| | | |
|---|---|---|
| 3,010,918 | 11/1961 | Ikeda . |
| 3,010,923 | 11/1961 | Ikeda . |
| 3,043,851 | 7/1962 | Fischer et al. . |
| 3,058,933 | 10/1962 | Ikeda . |
| 4,206,099 | 6/1980 | Bentley et al. ....................... 528/295.5 |

*Primary Examiner*—Tae Yoon
*Attorney, Agent, or Firm*—David G. Conlin; Linda M. Buckley

[57] ABSTRACT

The present invention provides polyester/vinyl dioxolane based coating compositions containing no or essentially no volatile organic components. Oligomers for forming the coating compositions of the present invention are vinyl dioxolane end-capped polyester oligomers.

22 Claims, 11 Drawing Sheets

POLYESTER/VINYL DIOXOLANE BASED COATING COMPOSITIONS

STATEMENT OF GOVERNMENT INTEREST

Funding for the present invention was obtained from the Government of the United States by virtue of Contract No. 68D60019 from the U.S. Environmental Protection Agency. Thus, the Government of the United States has certain rights in and to the invention claimed herein.

FIELD OF THE INVENTION

This invention relates to polyester/vinyl dioxolane based coating compositions containing no or essentially no volatile organic components (VOCs) and coatings formed therefrom.

BACKGROUND OF THE INVENTION

There is much interest in reducing, preferably eliminating VOCs, such as organic solvents, particularly in sprayable coating compositions. One factor which has promoted this interest is the need to reduce atmospheric pollution caused by the evaporation of these solvents during application and cure of coating compositions containing them. Such organic solvents are used in sprayable coating compositions to achieve the desired viscosity for coating applications.

Coating compositions for use in coating transportation vehicles, such as, trucks and automobiles, currently release substantial amounts of VOCs to the atmosphere during application and cure. Since VOCs are typically toxic, smog-producing and noxious, their continued release can cause a detrimental impact on worker safety and the environment. New methods for greatly reducing or eliminating VOCs during the application of such coatings are urgently needed to prevent worker injury and comply with current and pending environmental regulations. Of equal importance is the cost, performance and durability of such coating formulations.

Coating formulations that are used on the surfaces of all types of commercial automobiles and transportation vehicles to protect against the elements and provide an attractive, distinctive appearance include the two-component aliphatic polyurethane systems which provide excellent performance as automotive coatings after drying and cure. However, these coating systems currently use large quantities of flammable, toxic and environmentally hazardous organic solvents as diluents to lower the viscosity and make spraying operations possible. In addition, the polyurethane coating systems utilize pure aliphatic diisocyanage as one of the reactive components. The vapors of this volatile material that evolve during coating application and cure are toxic and irritating to workers, and hazardous to the environment. New automotive protective coating systems are required that provide excellent processing and performance without the need for volatile organic components (VOCs) that threaten worker safety and the environment.

A number of coating manufacturers are currently developing low/no VOC coating formulations including, high solids, blocked isocyanate polyurethanes and aqueous-based polyurethane dispersions. However, each of these newly emerging coating formulations possesses certain attributes but not without specific drawbacks. High solids formulations use low VOCs, provide equivalent performance to low solids urethanes, but cannot be applied using spraying techniques. Blocked isocyanate polyurethanes also use low VOCs, have low toxicity levels and good properties. These materials however, must be cured at elevated temperatures (150 to 200° C.) which are not practical when coating automobiles. Aqueous based polyurethanes use no VOCs, are nontoxic and easy to apply via spraying, but to date, have not provided the properties required to meet military specifications, such as adhesion and moisture-resistance. Presently there is no cost-competitive, high performance low/no VOC substitute for current solvent-based polyurethane automotive coating systems.

Polyesters are polymers formed by the reaction of aliphatic or aromatic polyol monomers with aromatic or aliphatic diacids in the presence of catalyst, usually, metallic acetates, such as calcium acetate. These materials have emerged as promising candidates for inclusion as components in advanced aircraft coatings because of their combination of useful properties including: clarity, transparency, absence of color, flexibility, excellent adhesion to most substrates, abrasion-resistance, water-resistance, fuel and oil-resistance, UV-resistance, weather-resistance, variable hardness—from elastomer to tough plastic, moderate cost, low temperature flexibility and availability as variable molecular weight, ester-endcapped, difunctional prepolymers.

Polyester polymers cannot be used as coatings themselves since their functionality as produced is not conducive to the formation of hard, cross-linked coatings. To be used to advantage as advanced coatings, polymers are first functionalized with reactive groups, such as hydroxyl groups, and then cured by chemical reaction with other comonomers, such as polyurethane diisocyanate monomers, into hard, tough polymer resins that can be used as protective coatings. Hydroxy-functional, polyester-based reactive prepolymers are frequently selected for use as components in polyurethane coatings over polyether and other type, polymers since they impart superior solvent-resistance, mechanical toughness and clarity to the coating and do not yellow upon exposure to intense UV light.

The major problems associated with the use of polyester-derived polyurethanes have involved the requirement for addition of substantial quantities of flammable, toxic solvents to polyurethane coating formulations to lower viscosity sufficiently for spray-painting operations. Another problem involved the use of toxic, irritating and volatie diisocyanate monomer components as major components in the polyurethane coating. The vapors that evolved from polyurethane coating operations could cause serious injury to workers breathing the fumes if they were not wearing protective equipment.

A number of polyester-polyurethane coating manufacturers have been actively pursuing the development of low VOC and no VOC polyurethane coating formulations. To date however, none of these coatings has exhibited the required processibility or properties for use in e.g., automotive coatings.

Accordingly, sprayable polyester based coating compositions which contain no volatile organic components yet provide coatings having useful properties are desired.

SUMMARY OF THE INVENTION

Figure 1:
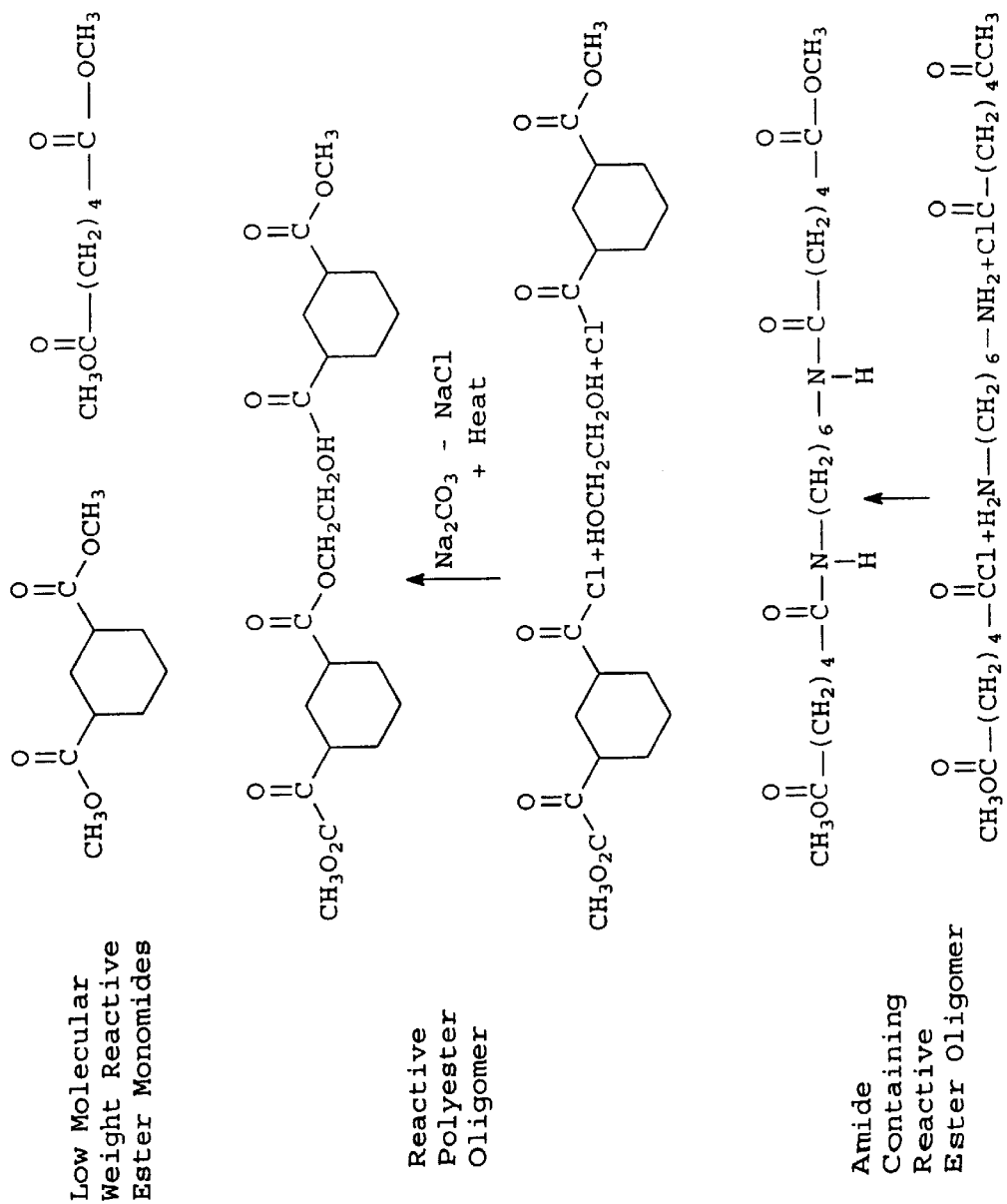
FIG. 1 shows exemplary carbomethoxy-functional reactive polyesters and chemical reactions leading thereto.

The present invention provides a new class of no or essentially no VOC, environmentally-compliant, high performance polyester/vinyl dioxolane based coating compositions (sometimes referred to hereinafter as "PEVD") that are economical and easily-applied, without hazard to workers or the environment.

The coating compositions of the present invention comprise one or more polyester vinyl dioxolane prepolymers which are formed into a coating by the action of a catalyst system comprising cobalt, aluminum and zinc. It was found that the catalyst system is key in obtaining a coating having desired performance characteristics.

In one preferred embodiment, these no VOC coating compositions comprise:

(a) at least one prepolymer which comprises the reaction product of
  (i) at least one substituted vinyl dioxolane monomer having the formula

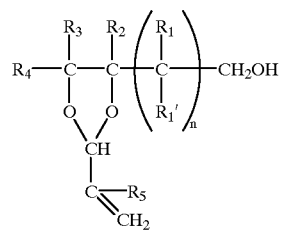

Formula I wherein $R_1$ and $R_1'$ are independently hydrogen or an alkyl group having from 1 to 10 carbon atoms, n is a number from 0 to about 10, and $R_2$, $R_3$, $R_4$ and $R_5$ are independently hydrogen or an alkyl group having from 1 to about 10 carbon atoms; and
  (ii) at least one ester of a polycarboxylic acid; and
(b) a catalyst system comprising cobalt, aluminum and zinc to initiate polymerization of the prepolymers of step (a) to form a coating.

In some embodiments, the coating compositions further comprise at least one of a peroxide initiator and a solubility enhancer.

In preferred embodiments, the ester of the polycarboxylic acid has the formula:

Formula II wherein $R_6$ is a branched or unbranched, saturated or unsaturated, alkyl or alkoxy group having from 1 to about 20 carbon atoms or a cyclic alkyl or alkoxy group having from about 1 to about 20 carbon atoms: and $R_7$ and $R_8$ are the same or independently selected from $-CH_3$ or an alkyl group having up to about 10 carbon atoms; and $R_9$ is $-H$ or a branched or unbranched alkyl or alkoxy group having from 1 to about 20 carbon atoms or a cyclic alkyl or alkoxy group having from 1 to about 10 carbon atoms.

In some embodiments, $R_6$ further comprises at least one amide linkage.

Catalyst systems useful in initiating polymerization of the prepolymers to form the coatings of the present invention comprise cobalt, aluminum and zinc. Cobalt is present at up to about 1.0 weight %, zinc at up to about 0.5 weight %, and aluminum at up to about 0.6 weight %.

In one preferred catalyst system, cobalt is present as cobalt octoate at from about 0.01 to about 0.5 weight %; zinc is present at from about 0.01 to about 0.5 weight %; and aluminum is present at from about 0.01 to about 0.6 weight %. The total weight % of the cobalt/zinc/aluminum catalyst system is less than about 1.5 weight %, preferably less than about 1.0 weight %. As used herein weight % means the % of the total weight of the metal catalyst, through drier, cobalt activity mediator, combined catalyst organic components, and PEVD prepolymer and any other components.

In one especially preferred catalyst system, cobalt is present as cobalt octoate, zinc as zinc octoate and aluminum as an aluminum organic complex.

In some preferred embodiments, the catalyst system further comprises at least one of a peroxide initiator and a solubility enhancer. Preferred peroxide initiators comprise dibenzoyl peroxide or methyl ethyl ketone peroxide. Preferred solubility enhancers comprise N,N'-dimethylaniline and N,N', N", N"'-tetramethylethylenediamine (TMEDA). Peroxide initiator is preferably present at from about 0.10 to about 5.0 weight % and solubility enhancers are present at from about 0.01 to about 1.0 weight %.

Esters of polycarboxylic acids are useful in the practice of the present invention. Preferred difunctional, trifunctional and polyfunctional esters, include hydroxy functional, saturated and unsaturated, alkyl esters, such as, adipate phthalate, and malonate esters; cyclohexane dicarboxylic acid esters; and various alkyl ployols, such as ethylene glycol based polyesters. Polyester prepolymers useful in the practice of the present invention also include those having cyclohexane groups along the backbone, as well as amide containing oligomers.

Difunctional saturated polyester oligomers are preferred components of the coating compositions of the present invention. Saturated esters are especially preferred for colorless coatings, because they are less light-sensitive and, thus, less prone to yellow. Particularly preferred saturated esters include adipate and cyclohexane diesters.

In one preferred coating composition according to the present invention, the substituted vinyl dioxolane monomer is 2-vinyl-4-hydroxymethyl-1,3-dioxolane (HMVD) or 2-vinyl-4-hydroxybutyl-1,3-dioxolane (HBVD) or a blend thereof. In a particularly preferred coating composition according to the present invention, the substituted vinyl dioxolane monomer is HMVD and the alkyl ester is dimethyl 1,4-cyclohexane dicarboxylate.

Preferred coating compositions according to the present invention are sprayable. Such coating compositions have a viscosity from about 10 to about 150 mPa·s, more preferably from about 20 to about 150 mPa·s.

Coating compositions according to the present invention may further comprise at least one reactive diluent to adjust the viscosity or other properties as desired. Such reactive diluents when used are present at from about 1 to about 50 weight %. Preferred reactive diluents include vinyl group containing compositions such as trimethylol propane triacrylate. Another preferred vinyl containing reactive diluent comprises at least one substituted vinyl dioxolane monomer having the formula:

Formula III

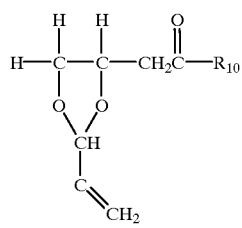

wherein $R_{10}$ is a branched or unbranched, saturated or unsaturated, alkyl or alkoxy aliphatic group having from 1 to about 10 carbon atoms. In some embodiments, $R_{10}$ may further comprise one or more urethane, ester, or amide linkages. The coating compositions of the present invention may also include as the reactive diluent HMVD or HBVD or a blend thereof.

Other preferred reactive diluents include mono-functional esters.

In the high performance PEVD coating compositions of the present invention, the polyester components contribute the following important properties: strong adhesion, UV-stability, moisture-resistance, fuel, oil and hydraulic fluid-resistance, high rain erosion-resistance, low temperature flexibility, hardness, absence of color, transparency and capability to vary properties over wide range. These PEVD coating compositions also eliminate the following deficiencies that are usually found in the solvent-based polyurethane coating system: requirement of high VOC content for spraying, evolution of toxic, irritating isocyanate and requirement for high temperature cure.

The vinyl dioxolane component of the PEVD compositions of the present invention contributes to the following positive attributes of the coating: low viscosity for spraying, no VOC coating system, air-drying at room temperature, lower cost than polyurethane, no toxic fumes evolved, increases coating hardness against rain erosion and UV-resistance. Further substantial cost reductions are achieved by eliminating the need for complex, expensive pollution control and solvent-recovery systems, since the PEVD coating invention evolve essentially no VOCs. The unseen cost of polluting the environment is also eliminated.

The coating compositions of the present invention were applied via hand-coating techniques to either steel panels or steel/zinc phosphated/electrocoated/primed panels and cured to various temperatures. Unlike conventional VOC containing coating systems, the innovative coating compositions of the present invention released no volatile, toxic or flammable components to the environment during application or cure via air-drying at room temperature. This feature, combined with excellent performance as a protective coating results in a highly desirable coating composition.

DETAILED DESCRIPTION OF THE INVENTION

In preparing the coating compositions of the present invention, simple vinyl dioxolanes, fluid and low in viscosity, are reacted with polyester based oligomers to form vinyl dioxolane end-capped polyester prepolymers that have the desired properties, e.g., the appropriate viscosity, sheeting and surface-wetting capability, for use as coating compositions to form protective coatings.

Selection of the appropriate catalyst system is key to obtaining coatings having the desired characteristics. The catalyst system can be added to the PEVD prepolymer before or during application of the coating composition to the surface to be coated.

It has been found a catalyst system comprising cobalt, aluminum and zinc cures the PEVD prepolymer to form coatings having desirable characteristics. Cobalt acts as an oxidation polymerization catalyst that generates free-radicals from a peroxide source (oxygen) to polymerize molecules containing an unsaturated group (the pendant vinyl groups of PEVD). During PEVD polymerization, peroxides are generated by the interaction of the dioxolane ring with catalyst, oxygen and heat, yielding hydroxyl groups as a byproduct. Aluminum acts as a through dryer. It is believed to form chemical or coordinative bonds with functional groups such as amine, hydroxyl (produced during PEVD polymerization) and ester (present in PEVD) groups, thus linking together adjacent molecules into a network structure.

Cobalt, manganese, vanadium and cerium based oxidation polymerization catalysts were evaluated. See Table 5 and the Examples, below. Cobalt was selected as the oxidative polymerization catalyst, because of its desirable properties, e.g., it does not cause particle formation during coating formulation to the extent of manganese, vanadium and cerium catalysts and it has high activity. However, cobalt's high activity caused coating skinning, i.e., the formation of a skin over a fluid coating layer and particle formation within the coating "Skinning" was the result of the high cobalt activity causing rapid PEVD polymerization at the coating/air interface. Skin formation prevents migration of oxygen into the bulk of the coating, causing a decreased rate of prepolymer cross-linking due to a lack of peroxide source, resulting in a liquid (uncured) layer between the substrate and coating skin. Coating curing may therefore require extremely long times or elevated temperatures to go to completion, or may never fully cure at all.

In order to minimize skinning with cobalt, zinc was evaluated as a cobalt activity mediator for use in the coating compositions of the present invention and was found to reduce skinning and particle formation to an acceptable level, i.e., to achieve coatings having desirable characteristics.

Particle formation could be due in part to insolubility of the catalyst in PEVD, rapid gelation around the catalyst droplet (high localized concentration) before it has time to disperse and dissolve the metal complex into the prepolymer, or rapid gelation due to high catalyst activity. Catalyst was added to the prepolymer liquid in the form of drops of catalyst solution (metal complex dissolved in organic carrier) and mixed into the prepolymer by mechanical agitation. In most cases, catalysts initially dissolved into PEVD forming solutions in which particles precipitated, suggesting catalyst insolubility was not the cause. Gelation could be caused by either vinyl group polymerization or the formation of chemical/coordinative bonds forming cross-links between PEVD prepolymer molecules. The extent of particle formation was controlled to an acceptable level by adjusting the cobalt concentration, adjusting the cobalt activity level, removing any dissolved oxygen from the prepolymer prior to cobalt addition, and adding cobalt to the prepolymer under an oxygen-free environment.

Aluminum acts as a through drier in systems containing hydroxyl or carboxyl groups and used to increase coating cure at ambient temperatures (OM Group, Inc., hereinafter "OMG"). Hydroxyl is produced during PEVD polymerization and carboxyl is found in the —C=O group in the ester of PEVD. It was found that Aluminum is a preferred through drier for use in the coating compositions of the present invention.

Various combinations of cobalt/aluminum/zinc with PEVD were investigated for their combined effect on particle formation, coating cure at near ambient temperatures and final coating properties. One preferred catalyst system for use in the coating composition of the present invention comprises cobalt at up to about 1.0% by weight, aluminum at up to about 0.5% by weight and zinc at up to about 0.5% by weight. A particularly preferred catalyst system for use in the present invention comprises cobalt present at from about 0.001 to about 0.5% weight %, aluminum present at from about 0.01 to about 0.1 weight %, and zinc present at from about 0.01 to about 0.1 weight %.

Other preferred catalyst systems for use in the present invention include those containing at least one of a peroxide initiator and a solubility enhancer. Preferred peroxide initiators comprise dibenzoyl peroxide and methylethyl ketone peroxide. Preferred solubility enhancers comprise dimethylaniline and N,N', N'',N'''-tetramethylethylenediamine (TMEDA). The amount of TMEDA selected is preferably equal to about twice the weight % of cobalt to provide about equivalent molar quantities. Peroxide initiators are present at from about 0.1 to about 5.0 weight % and solubility enhancers are present at from about 0.01 to about 1.0 weight %. The initiator depends upon the cobalt concentration and the concentration of the solubility enhancer is selected based upon the concentration of the cobalt, aluminum and zinc.

In preferred coating compositions, the catalyst system comprises no more than about 1.5% by weight.

PEVD coating catalysis and coatings are described more fully below in connection with Tables 5 to 8 and Examples 4 to 6.

Vinyl dioxolanes are low-viscosity liquids that are readily synthesized by the reaction of low-cost starting materials that convert from the liquid state to hard, tough tenacious, flexible films that adhere strongly to metal substrates when exposed to air at room temperature and in the presence of a catalyst, such as cobalt. The mechanism of cure involves a ring-opening reaction in the presence of air and catalyst, forming pendant hydroxyl groups (contribute strong adhesive properties) and polymerizing the vinyl group into a highly cross-linked, hard coating. Since the vinyl dioxolanes are a low viscosity liquid, they require no solvents or unreactive diluents for their application as spray-coatings and are therefore completely free of VOCs.

Vinyl dioxolane reactive monomers can be made by condensing an unsaturated aldehyde, such as acrolein, with an appropriate 1,2-diol or triol, such as glycerol, in the presence of an acidic catalyst, such as p-toluenesulfonic acid.

Although the simple vinyl dioxolanes undergo cure in air at room temperature to form hard coatings, they are very fluid and too low in viscosity for application alone (coatings would be too runny). In the coating compositions of the present invention, they are reacted with viscosity-building components, such as phthalate, adipate, malonate and other polyfunctional, saturated or unsaturated polycarboxylic acid esters via transesterification to form vinyl dioxolane-endcapped polyester monomers that are of sufficient viscosity for use as protective coatings. These air-dried, room temperature cured systems of the present invention can be used as clear coatings or they can be formulated with pigment into a variety of colors. A few pigments might retard the drying process at room temperature, but this can be overcome by low temperature baking of the coating.

In accordance with the present invention, one or more substituted vinyl dioxolane monomers and one or more polyester prepolymers are copolymerized with a catalyst system in a reaction medium comprising the vinyl dioxolanes and polyester prepolymers to form vinyl dioxolane end-capped polyester prepolymers.

The selection of the substituted vinyl dioxolane component(s), the ester component(s) and the catalyst system for use in the coatings of the present invention is discussed below.

In preferred coating compositions, the viscosity of the vinyl dioxolane end-capped polyester prepolymers of the present invention is controlled to render them sprayable by selection of the appropriate combination of vinyl dioxolane monomer or blends thereof, alkyl ester, or blends thereof, and catalyst system. The viscosity may also be modified by including reactive diluents in the coating compositions of the present invention.

Vinyl dioxolanes suitable for use in the present invention are described for example, in U.S. Pat. No. 3,010,923 (the '923 patent) the teachings of which are incorporated by reference, which disclosed substituted vinyl dioxolane compounds for coating applications which contain a plurality of 2-vinyl-1,3-dioxolane groups. Although the '923 patent taught that the coating compositions disclosed therein can be applied in aqueous media, the '923 patent taught that spraying of the disclosed compositions is achieved by diluting with a volatile organic solvent such as toluene. See, e.g., column 15, lines 26–29 and lines 40–49. Furthermore, it appears that the only coating composition reported to be free of solvent suggested in the '923 patent can be found in Example 68. See also related U.S. Pat. Nos. 3,010,918; 3,055,766; 3,058,933; and 3,245,927.

Preferred substituted vinyl dioxolane monomers for use in forming vinyl dioxolane end-capped polyester prepolymers for use in the coating compositions of the present invention have a rapid rate of reaction with the alkyl ester component; are low in volatility and toxicity; and provide coatings having transparency and appropriate color which cure in air at room temperature in presence of a catalyst.

Preferred substituted vinyl dioxolane monomers for use in the present invention are shown in Formula I, above.

Substituted vinyl dioxolane monomers for use in the present invention are readily made by known methods, e.g., by condensing an unsaturated aldehyde, such as acrolein, with an appropriate 1,2-diol or triol, such as glycerol, in the presence of an acidic catalyst, such as p-toluenesulfonic acid. Such substituted vinyl dioxolane monomers are autooxidizable, that is, on exposure to the air the monomer under goes a cross-linking reaction. The mechanism of cure is thought to and has been reported to involve a ring-opening reaction in the presence of air and catalyst, forming pendant hydroxyl groups (which contribute strong adhesive properties) and polymerizing the vinyl group into a highly cross-linked, hard coating. Accordingly, in forming substituted vinyl dioxolane end-capped polyester prepolymers for use in the present invention, care must be taken to avoid the use of reactants which cause premature opening of ring. For example, the substituted vinyl dioxolane monomers should be stable to selected reaction catalysts for formation of the vinyl dioxolane end-capped polyester prepolymers. Preferred vinyl dioxolane monomers are stable in the presence of the catalyst systems of the present invention.

2-vinyl-4-hydroxymethyl-1,3-dioxolane (HMVD) and 2-vinyl-4-hydroxybutyl-1,3-dioxolane (HBVD) as shown below are particularly preferred substituted vinyl dioxolanes for use in preparing the coating compositions of the present invention.

Formula IV

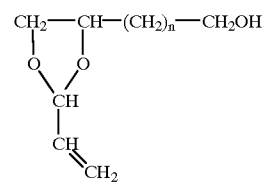

HMVD; n = 0
HBVD; n = 3

HMVD and HBVD are conveniently synthesized from two starting materials, namely, acrolein and glycerin in the case of HMVD, and 1,3-hexanetriol in the case of HBVD, using standard chemical equipment as illustrated below:

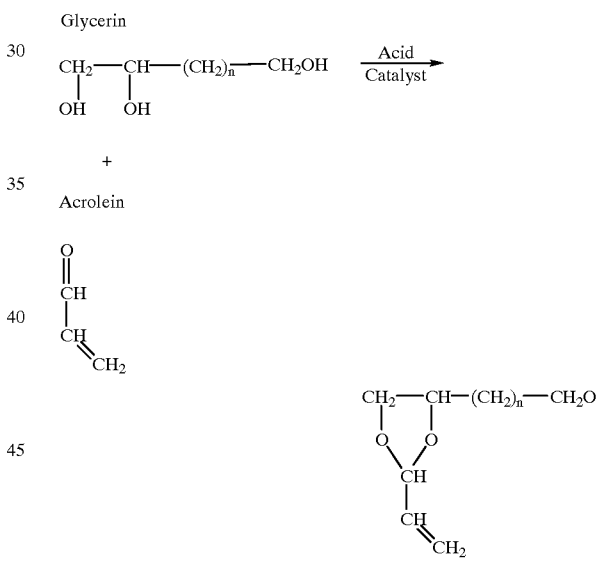

Particularly preferred coating compositions of the present invention can be applied by spray coating. In formulating such spray coatable compositions, the viscosity of vinyl dioxolane monomer is taken into consideration, as well as the degree of cross-linking that the particular vinyl dioxolane monomer is likely to provide.

The viscosity of vinyl dioxolane end-capped polyester prepolymers can be adjusted to be made suitable for spraying by, e.g., adding reactive diluents. The reactive diluent reacts with the components of the coating compositions, and provides no volatile organic components once reacted. Particularly preferred reactive diluent monomers include substituted vinyl dioxolanes as shown in Formula III above.

Vinyl dioxolane monomers as shown in Formula I above, including HMVD and HBVD, can also be used as reactive diluents. In such a case, an excess of the vinyl dioxolane monomer of Formula I over that required to react with ester groups of the polyester prepolymer is used.

Although preferred reactive diluents have the vinyl dioxolane group, other low viscosity vinyl containing monomers such as trimethylol propane triacrylate (TMPTA) can also be used as reactive diluents. Further, esters can also be used as diluents.

The viscosity of the various PEVD prepolymers synthesized was determined visually by comparison to common liquids. Any evidence of gelation or particulates was initially noted and prepolymer appearance was monitored with time. This was deemed to be sufficient to allow judgement as to the suitability for spray application of the prepolymer.

The coating compositions of the present invention comprising HMVD end-capped polyester prepolymers exhibited desirable property and processing advantages, including very low viscosity, rapid reaction with polyester comonomers and formation of tough, adherent, colorless coatings that cured in air at room temperature. For these reasons, HMVD is an especially preferred substituted vinyl dioxolane for use in the coating compositions of the present invention.

Esters of polycarboxylic acids suitable for use in the practice of the present invention are disclosed, e.g., in the '923 patent, supra. Preferred difunctional, trifunctional and polyfunctional esters, include hydroxy functional saturated and unsaturated alkyl esters such as adipate phthalate, and malonate esters; cyclohexane dicarboxylic acid esters; and various alkyl ployols, such as ethylene glycol based polyesters.

The term "polyester" as used herein also includes polymers which are not made up fully of polyester linkages. For example, other linkages which may also be present in a vinyl dioxolane end-capped polyester prepolymer of the present invention, depending upon ingredients used and reaction conditions, include those having cyclohexane linkages along the backbone, as well as amide linkages.

Exemplary chemical reactions leading to carbomethoxy-functional reactive polyester oligomers are illustrated in FIG. 1.

Aliphatic polyesters are preferred over aromatic polyesters in preparing the reactive oligomers or prepolymers of the present invention, particularly in forming colorless coatings, even though aromatic polyester groups are considerably more reactive than the aliphatic polyester groups for a number of reasons. Coating products made from aromatic polyesters suffer the disadvantage that they degrade more easily than do those prepared from aliphatic polyesters, especially when exposed to UV light. The higher resistance of products prepared from aliphatic polyesters to UV light-induced degradation means that coatings based on them have better yellowing and chalk resistance than those based on aromatic polyesters.

As used herein, the term "aliphatic" includes "cycloaliphatic" and saturated and unsaturated groups. Preferred aliphatic polyesters for use in forming vinyl dioxolane end-capped polyester prepolymers for use in the coating compositions of the present invention have a rapid rate of reaction with the substituted vinyl dioxolane monomer; are low in volatility and toxicity; provide coatings having transparency and appropriate color which cure at room temperature in presence of a catalyst; and, in particularly preferred embodiments, react to form spray-coatable vinyl dioxolane end-capped polyester prepolymers.

Preferred polyesters for use in the coating compositions of the present invention have Formula II, supra. Dimethyl 1,4-cyclohexane dicarboxylate is one preferred polyester prepolymer for use in the coatings of the present invention and can be prepared by reacting HMVD and dimethyl 1,4-cyclohexane dicarboxyate as illustrated below:

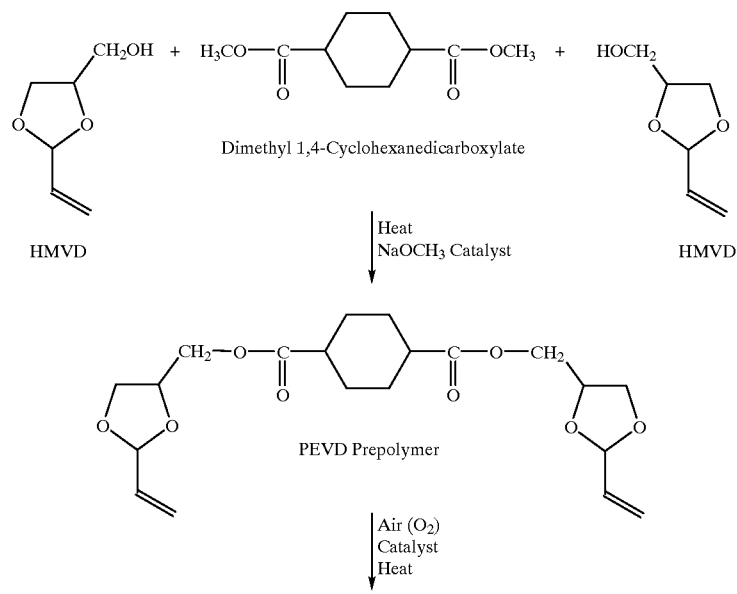

-continued

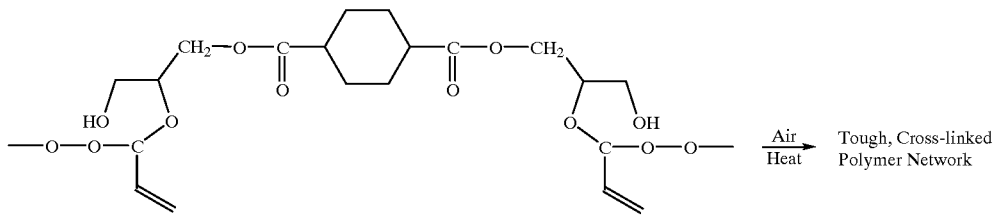

It should be noted that in forming the coating compositions of the present invention mixtures of substituted vinyl dioxolane monomers may be used. Mixtures of aliphatic polyesters may also be used.

The coating compositions of the present invention will be illustrated by coating compositions containing a polyester prepolymer prepared by the reaction of 4-(Hydroxymethyl)-2-vinyl-1,3-dioxolane (HMVD) and dimethyl cyclohexanedicarboxylate in the presence of cobalt octoate, an aluminum based through drier, and a zinc based cobalt activity mediator. However, it is not intended to limit the scope of the coating compositions of the present invention to these components.

Reaction conditions were adjusted to maximize the formation of the PEVD prepolymer while minimizing unwanted and undesirable side-reactions. The most deterious side-reaction is the opening of the dioxolane ring system at elevated temperatures, resulting in the formation of free radicals which can induce cross-linking via the pendant vinyl groups and cause gelation of the prepolymer. Introduction of color into the prepolymer by thermal degradation of the reactants or the PEVD prepolymer is an undesirable side-reaction because of the intended use of the PEVD coating compositions of the present invention as a clear and colorless topcoat. Thus, the length of time the reaction is carried out at elevated temperatures as well as the maximum reaction temperature is kept to a minimum.

Most chemical reactions involve an equilibrium situation where the reaction combining reactants to form products (i) is in competition with the decomposition reaction of the product into reactants (ii). with product formation being slightly favored. One way to assist the formation of PEVD is to generate a reaction byproduct which can be removed from the reaction environment and shift this equilibrium situation to favor product formation (i).

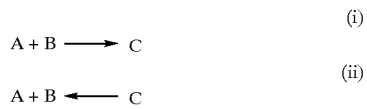

When the PEVD prepolymer is produced by an ester interchange reaction involving replacing, for example, the methoxy groups of dimethyl 1,4-cyclohexanedicarboxylate with methoxy vinyl dioxolane groups, methanol is evolved as a reaction byproduct. Methanol can be distilled from the reaction apparatus as its toluene azeotrope at the elevated reaction temperatures used.

The coating compositions of the present invention can be used as clear, unpigmented coating compositions, or they can be pigmented, using proportions well known in the art, with pigments commonly used in the coating industry, such as metal oxides, sulfides, sulfates, silicates, chromates, iron blues, organic colors, and metal flake pigments. Since some pigments retard drying, it is preferable to avoid them since the coating compositions of the present invention are air-drying materials. However, the retarding effects can be minimized as known in the art by force-drying or incorporating suitable additives.

The coating compositions can be blended with other well known film-formers such as vegetable oils, oil-modified alkyd resins, oleoresinous varnishes, alkylated urea aldehyde resins, alkylated melamine aldehyde resins, polyepoxy-polyhydroxy resins, phenol aldehyde resins, cellulose acetate, cellulose acetate butyrate, polymers, and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; and silicones.

Other common ingredients of organic film-forming compositions can be used in the manner and in proportions well known in the art. These include plasticizers, catalysts, hardeners, anti-skinning agents and surface active agents.

The clear unpigmented compositions of this invention can be made by simply mixing the ingredients as taught in the present specification. When pigmentation is involved, a conventional pigment grinding or dispersing step is required. The coating compositions of this invention are useful for protecting and/or decorating articles made of such materials as wood, metal, ceramic, leather and fabric. The coatings of the present invention are applied by spraying followed by normal air-drying via simple exposure to air at ordinary room or atmospheric temperature or by force-drying at a convenient temperature above ambient temperature but below a temperature which decomposition or some other objectionable results occur or a combination of both.

The coating compositions of the present invention are applied by spraying, including airless and electrostatic spraying.

The coating compositions and coatings of the present invention will be further illustrated with reference to the following Examples which are intended to aid in the understanding of the present invention, but which are not to be construed as a limitation thereof.

EXAMPLES

Materials

The following metal carboxylates were obtained as samples from OM Group, Inc., Cleveland, Ohio and used as received (Table 1 below).

Dimethyl 1,4-cyclohexanedicarboxylate (97% purity, mixture of cis and trans isomers) was obtained from the Aldrich Chemical Co. (No. 20, 643-1) and used as received.

4-(Hydroxymethyl)-2-vinyl-1,3-dioxolane (hydroxymethyl vinyl dioxolane, HMVD) was obtained as a sample from Degussa Corporation, Chemicals Division, Ridgefield Park, N.J., and used as received.

Sodium methoxide ($NaOCH_3$), toluene (anhydrous), dichloromethane, hexanes, activated neutral aluminum oxide (60 to 50 mesh), hydroquinone, methyl ehtyl ketone peroxide, dimethylaniline, dicumylperoxide were obtained from commercial sources and used as received.

Metal substrates were either 3 in.×5 in. steel (low carbon, cold-rolled, SAE 1010) or 4 in.×6 in. aluminum ("yellow chromated" 2024-T3 alloy) panels from Q-Panel Lab Products, Cleveland, Ohio.

TABLE 1

Metal carboxylate catalysts for the PEVD cross-linking reaction

| Trade Name | Active Agent | Function |
| --- | --- | --- |
| Catalyst 510 | 12% Cobalt octoate | Oxidative polymerization catalyst which aids peroxide decomposition, generating radicals that initiate additional polymerization of alkenes. Through drier. |
| AOC 1020X | 8% Aluminum organic complex | Through drier which forms cross-links between adjacent polymer chains. |
| Zinc Hex-Chem | 18% Zinc octoate | Decreases cobalt activity level and reduces coating wrinkling or skinning problems. |
| Cobalt Nap-All | 6% Cobalt naphthenate | Oxidative polymerization catalyst and through drier. |
| Manganese Chem-All LC | 12% Manganese mixed carboxylates | Oxidative polymerization catalyst and through drier. |
| Cerium Hex-Chem | 12% Cerium octoate | Oxidative polymerization catalyst and through drier. |
| Cur-Rx | 4% Vanadium octoate | Oxidative polymerization catalyst. |
| Dri-Rx LC | 30% 2,2'-bipyridine | Chelating agent/accelerator for transition metals that increase their drying activity. |

Example 1

PEVD Synthesis and Purification

Figure 2:
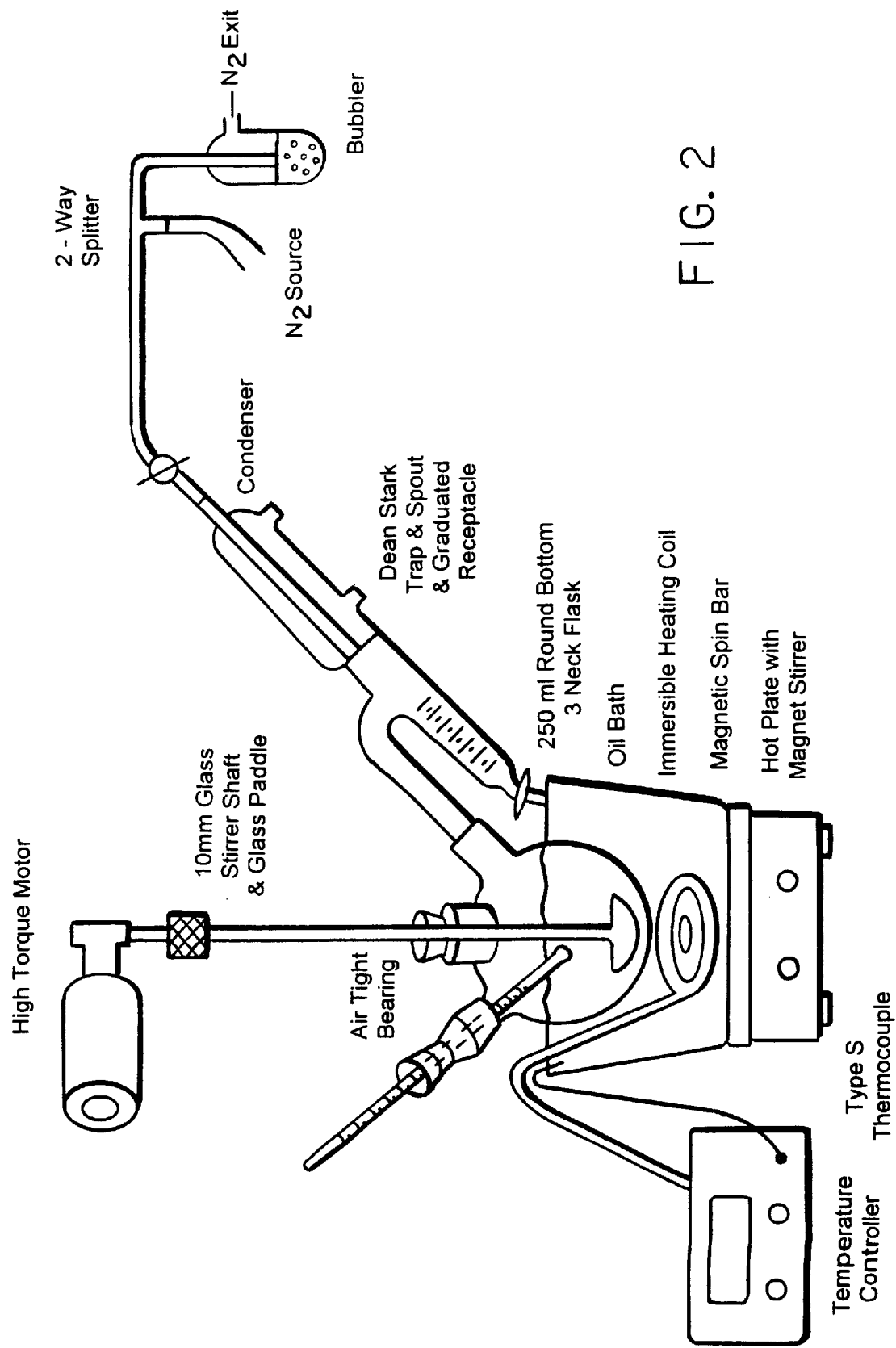
FIG. 2 shows an apparatus for the synthesis of the bis(methyl vinyl dioxolane)-1,4-cyclohexanedicarboxylate prepolymer (PEVD).

The HMVD polyester prepolymer synthesis involves replacing the methoxy group of dimethyl 1,4-cyclohexanedicarboxylate with methoxyvinyl dioxolane using sodium methoxide as a catalyst at elevated temperatures. Several reactions were carried out with each subsequent reaction undergoing modifications based on previous results and experiences before the final preparation procedure was developed. HMVD (505.09 g. 2.522 moles), dimethyl 1,4-cyclohexanedicarboxylate (656.66 g. 5.045 moles) and anhydrous toluene (656 g, as solvent) were weighed and added under an inert gas atmosphere in a glovebag to a three-necked round bottom flask equipped with a thermometer, mechanical overhead stirrer and Dean-Stark trap fitted with a condenser/nitrogen inlet (FIG. 2).

The reaction apparatus was removed from the glovebag and the mixture was stirred at ambient temperature under a positive nitrogen atmosphere until a solution resulted.

It is essential to establish anhydrous conditions prior to prepolymer formation to avoid reversal of the ester interchange reaction at the elevated reaction temperatures. Any residual water was removed from the reaction solution before catalyst addition by distillation of first the water/toluene axeotrope (85° C. boiling point). Toluene was then distilled into the Dean-Stark trap at 145° C. to remove any residual water from the reaction solution as a toluene/water azeotrope, with the azeotrope being removed via the stopcock at the bottom of the trap. After cooling to ambient temperature, sodium methoxide (7.56 g. 0.140 mole) was then added to the colorless water-free solution and the resulting orangish colored dispersion heated to reflux to initiate formation of the prepolymer product.

The prepolymer was produced by heating the reaction dispersion at 110 to 155° C. for approximately 7 hours. The progress of the reaction was monitored by the evolution of methanol, infrared spectroscopy and thin layer chromatography as discussed in more detail in Example 4 below. The evolved methanol was collected and measured in the Dean-Stark trap as its methanol/toluene azeotrope, with the azeotrope again being removed via the stopcock. The dark orangish colored dispersion was cooled to ambient temperatures after it was determined that the reaction had gone to completion.

The disappearance of the hydroxyl group of HMVD as the dioxolane was incorporated into the ester product was monitored by infrared (IR) spectroscopy. Organic functional groups such as hydroxyl (—OH), ester [—C(O)O—] and vinyl ($H_2C$=CH—) absorb light in the IR region of the electromagnetic spectrum. The locations of these absorption peaks are very characteristic of the types of organic functional groups in the material and their presence, absence or changes in intensity can be related to the material chemical structure or changes that it is undergoing due to chemical reactions. Samples of the reaction dispersion were withdrawn at various times after addition of the sodium methoxide catalyst. Several drops of the dispersion were placed on a sodium chloride IR disk and allowed to evaporate to dryness. The IR spectrum of the dispersion residue was obtained and analyzed for the absence of hydroxyl groups (the —OH stretch of HMVD appears at 3433 $cm^{-1}$) and retention of ester (the C=O stretch of aliphatic esters appear at 1750 to 1735 $cm^{-1}$), vinyl (the =$CH_2$ $\delta_{ip}$ appears at 1438 $cm^{-1}$) and dioxolane (—C—O—C— ring stretch appear at 984 and 943 $cm^{-1}$) groups (Fresenius, W., supra). IR spectroscopy was used to not only monitor the reaction progress but also confirm the presence of desired functional groups in the material upon exposure to reactive environments.

Thin layer chromatography (TLC) was used to detect the appearance of the product and the disappearance of the dioxolane and dimethyl cyclohexanedicarboxylate. Solubility and TLC experiments were initially carried out and the results used to select a 4/1 volume mixture of $CH_2Cl_2$/hexane as the elutent. Solutions containing the material(s) of interest were "spotted" approximately 0.5 in. from the bottom of an alumnia TLC plate, the "spots" allowed to air dry, the "spotted" plate was then placed into a sealed glass jar such that the plate bottom was immersed in the elutent and the elutent permitted to migrate up the plate to within 0.5 to 1 in. from the top of the plate. As the elutent travels up the TLC plate, it first dissolves the material(s) forming a solution, the compound(s) absorb/desorb on the aluminum oxide as the solution migration continues, with the individual compound migration rate being determined by the strength of this absorption/desorption, and the migration allowed to continue until the elutent reaches the plate top. An appropriate elutent would allow all compounds to migrate from their initial "spot", with one of the materials migrating to near the top of the plate, and sufficient separation in distance between the other compound "spots" to allow good resolution. Visualization of the compound(s) migration was accomplished by using either a UV source or an iodine vapor staining procedure. Individual solutions containing each of the reactants were eluted along with the reaction solution for comparison purposes. In this manner, the appearance of a new spot (reaction product) and the disappearance of reactant spots can be monitored with time. These methods are further discussed in Example 4 below.

Two different PEVD purification methods were investigated. One involved washing a dichloromethane solution of the resin with water to extract residual sodium methoxide and any sodium hydroxide which may have formed in the reaction into the aqueous phase. The dichloromethane solution was treated with anhydrous magnesium sulfate to remove residual water, filtered to remove the drying agent, and then the clear pale yellow filtrate was concentrated at 70° C. under reduced pressure. IR spectroscopy was used to confirm the absence of solvent and presence of PEVD prepolymer. However, this procedure required numerous steps, required a substantial amount of time and was thus judged unsatisfactory compared to the following purification procedure.

The crude HMVD/dimethyl cyclohexanedicarboxylate PEVD prepolymer was purified by first dissolving it into an equal volume of $CH_2Cl_2$ and filtering the orangish colored solution through a buchner fritted funnel to remove the sodium emthoxide catalyst and any gels that had formed. The filtrate was eluted through a column of neutral aluminum oxide to remove residual colored impurities, and concentrated at 50 to 100° C. under vacuum (76 cm Hg). The purified prepolymer was clear, yellow in color and exhibited a syrup-like viscosity. Typical yields of the purified PEVD prepolymer ranged from 89 to 77 weight %. The PEVD prepolymer is very stable at ambient temperatures when stored under an inert atmosphere, with its color and viscosity remaining unchanged over several months.

Example 3

PEVD Characterization

IR spectroscopy and TLC were used to characterize the PEVD prepolymer. TLC indicated the presence of reactants in the prepolymer as well as its purity, considered purified if only one spot appeared on the TLC plate upon exposure. A Boemem Michaelson FTIR spectrometer operating from 4000 to 600 $cm^{-1}$ was used to monitor the progress of the PEVD prepolymer synthesis and determine its chemical structure. IR spectra were obtained using a sodium chloride IR disk coated with either the reaction dispersion residue or PEVD. $^1H$- and $^{13}C$- nuclear magnetic resonance (NMR) spectroscopy was performed on a sample of PEVD prepolymer dissolved in deuterated chloroform using a 300 MHz Varian FT-NMR located at Brandeis University, Waltham, Mass. The chemical structural determination of PEVD from its IR and NMR spectra is discussed below.

Figure 3:
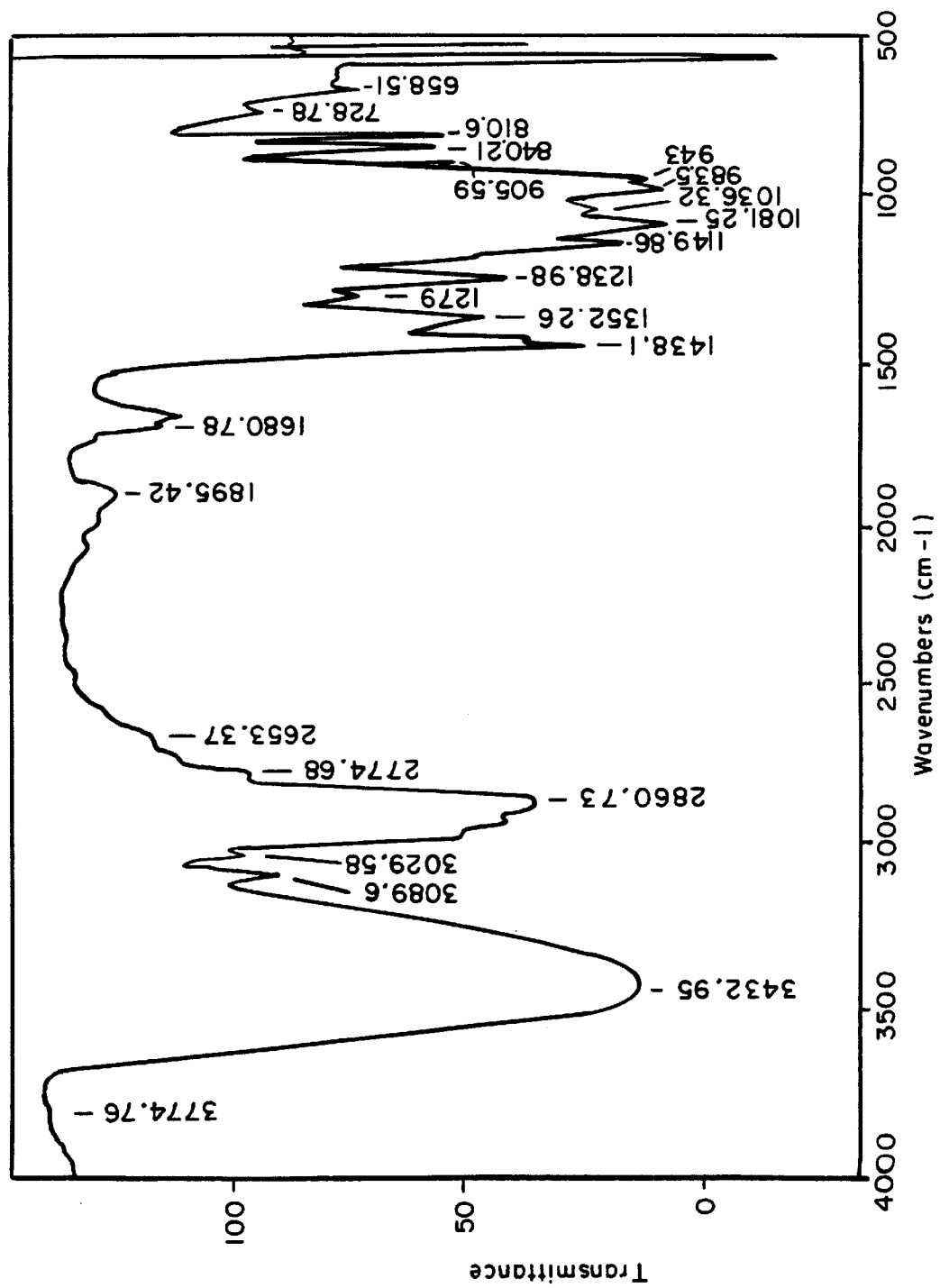
FIG. 3 shows the IR spectra of 2-vinyl-4-hydroxymethyl-1,3-dioxolane (HMVD).
Figure 4:
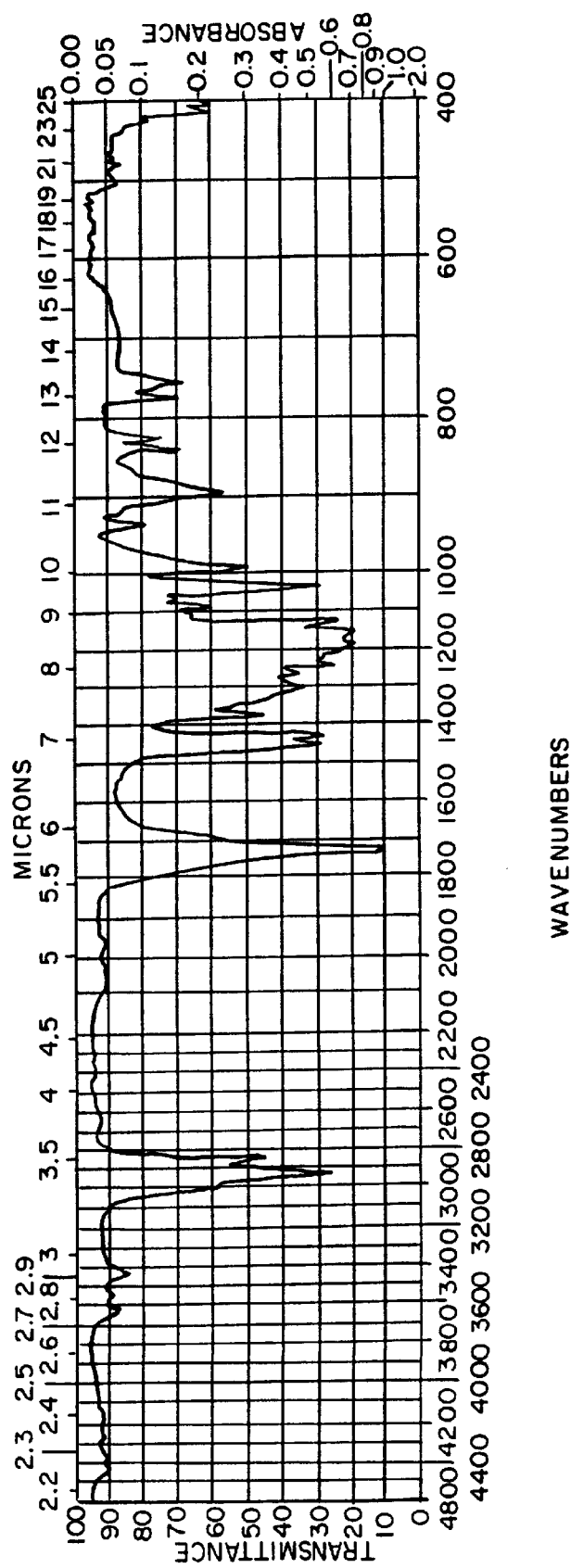
FIG. 4 shows the IR spectra of dimethyl 1,4-cyclohexanedicarboxylate.

The progress of the synthesis reaction was monitored by observing changes in the IR spectrum of HMVD, while verifying other portions of the HMVD and cyclohexanedicarboxylate spectra remained unchanged. The absorption peaks of interest consisted of the cyclohexanedicarboxylate ester [—C(O)O—] and HMVD hydroxyl (—OH), vinyl ($H_2C$=CH—) and dioxane ring (—C—O—C—). Absorption peak assignments were made based on the IR spectra of similar known compounds and spectral data tables. The absorption attributed to the —OH stretch of HMVD appears at 3433 $cm^{-1}$ while absorptions typical for dioxolane ring (—C—O—C—) stretch appear at 984 and 943 $cm^{-1}$ (FIG. 3) (Fresenius, W.; Huber, J. F. K.; Pungor, E.; Rechnitx, G. A.; Simon, W.; West, Ths. S., *Tables of Spectral Data for Structure Determination of Organic Compounds,* 2nd edition, Springer-Verlag, NY, 1989). Absorptions assigned to the C=O stretch of aliphatic esters appear at 1750 to 1735 $cm^{-1}$ (Fresenius, W. et al., supra). with dimethyl 1,4-cyclohoexanedicarboxylate having an absorption at 1734 $cm^{-1}$ (FIG. 4) (Pouchert, C. J., *The Aldrich Library of FT-IR Spectra,* edition 1, Aldrich Chemical Company, Inc., WI, 1985). This is sufficient spectral data to allow the monitoring of the progression of PEVD formation.

It is the disappearance of the pronounced absorption of HMVD at 3433 $cm^{-1}$ as HMVD becomes attached to the 1,4-cyclohexanedicarboxylate unit, forming the ester linkage, that was used to monitor the progress of the reaction. The displaced methoxy groups are converted into methanol under the reaction conditions, are distilled as a methanol/toluene azeotrope out of the reaction solution into the Dean-Stark trap, removed via the stopcock at the trap bottom, and the azeotrope volume measured using a graduated cylinder. Azeotrope distillation was confirmed by IR spectroscopy and boiling point, occurring at 63.7° C. rather than 64.7° C. (methanol) or 110.6° C. (toluene) (Weast, R. C., *Handbook of Chemistry and Physics,* 49th edition, The Chemical Rubber Co., Cleveland, Ohio, 1968). The amount of evolved methanol can be calculated from the azeotrope volume and its reported composition (Weast, R. C., supra). IR spectroscopy was also used to confirm the retention of other functional groups in PEVD initially present in HMVD, the dioxolane ring (—C—O—C— absorptions at 984 and 943 $cm^{-1}$) and vinyl (=$CH_2$ $\delta_{ip}$ absorption at 1438 $cm^{-1}$). Reformation of the ester linkage [—C(O)O—] was confirmed by the observation of an absorption at 1732 $cm^{-1}$, attributed to the C=O stretch.

Figure 5:
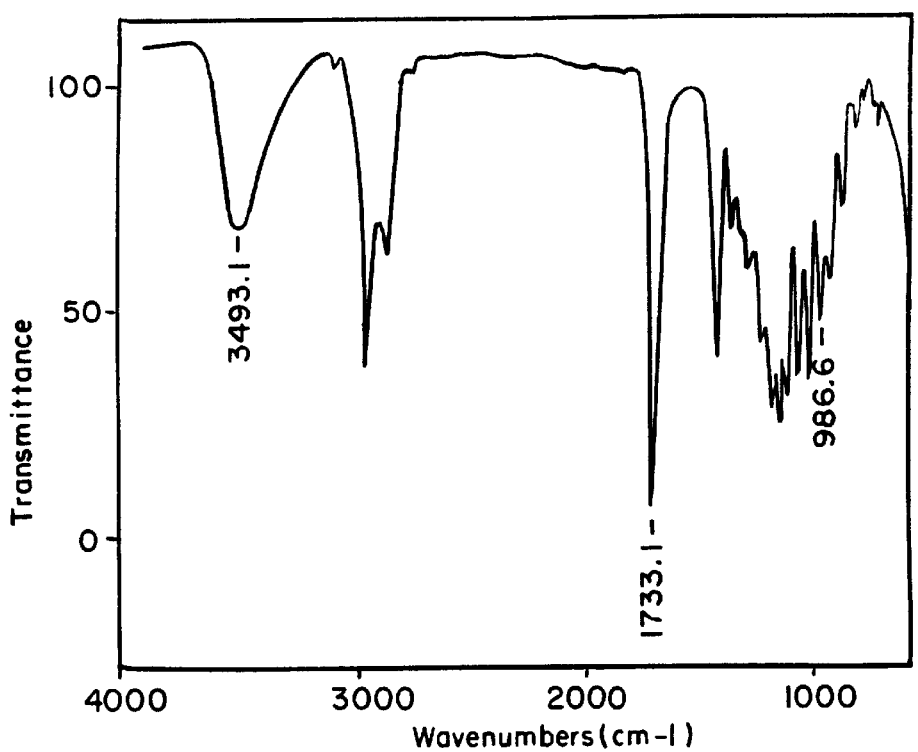
FIG. 5 shows the IR spectra of the reaction dispersion prior to any prepolymer formation.
Figure 6:
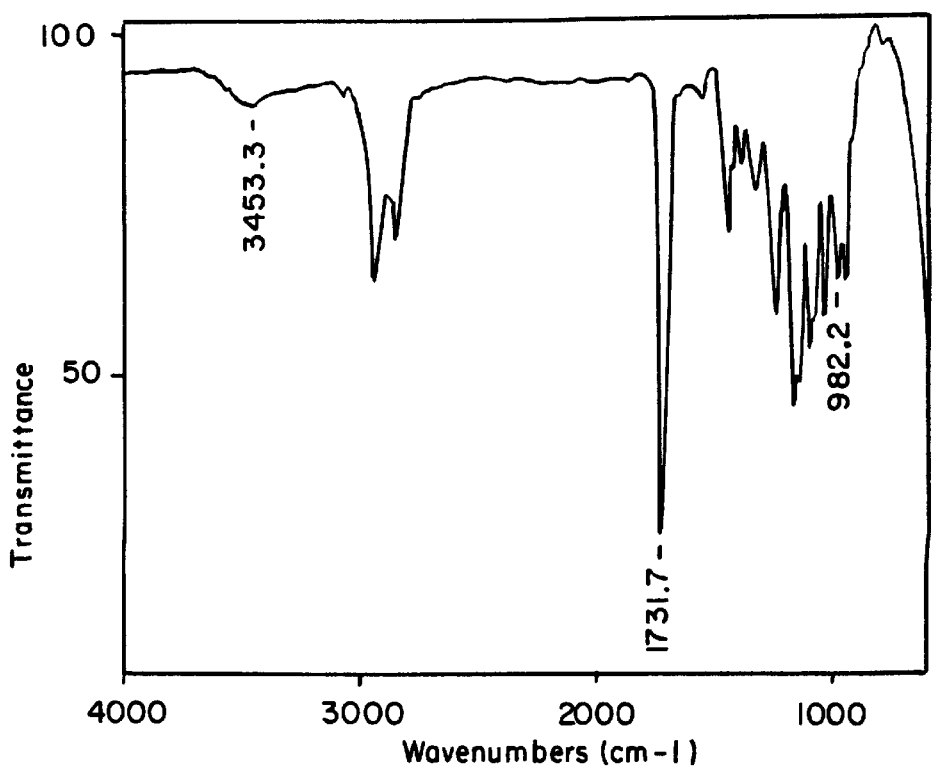
FIG. 6 shows the IR spectra of the reaction dispersion AFTER appreciable amounts of PEVD prepolymer has formedation.

The IR spectrum of the reaction dispersion prior to any prepolymer formation (FIG. 5) showed absorptions at 3493 (—OH). 1733 (C=O), 987 (—C—O—C—) and 940 (—C—O—C—) $cm^{-1}$, indicating that both reactants are present. The catalyst was then added and the reaction temperature gradually increased until methanol/toluene azeotrope distillation began. The reaction temperature was maintained at 100 to 125° C. for approximately 5 hours until azeotrope distillation ceased. After allowing the reaction to proceed almost to completion, the IR spectrum of the reaction dispersion had lost the —OH absorption at 3490 cm$^{-1}$ while maintaining an ester C=O absorption at 1732 cm$^{-1}$ and vinyl dioxolane absorptions at 1483, 982 and 940 cm$^{-1}$, indicating the dioxolane ring and pendant vinyl groups are still intact at the end of the reaction (FIG. 6). The reaction temperature was increased to 140 to 155° C. for approximately 2 hours to ensure the reaction had gone to completion and then cooled to ambient temperatures. The time the reactants and PEVD prepolymer are exposed to elevated temperatures must be minimized in order to avoid undesirable side-reactions that generate color and cross-links which result in gelation. The completeness of the reaction was confirmed by thin layer chromatography (TLC) and IR spectroscopy.

Figure 7:
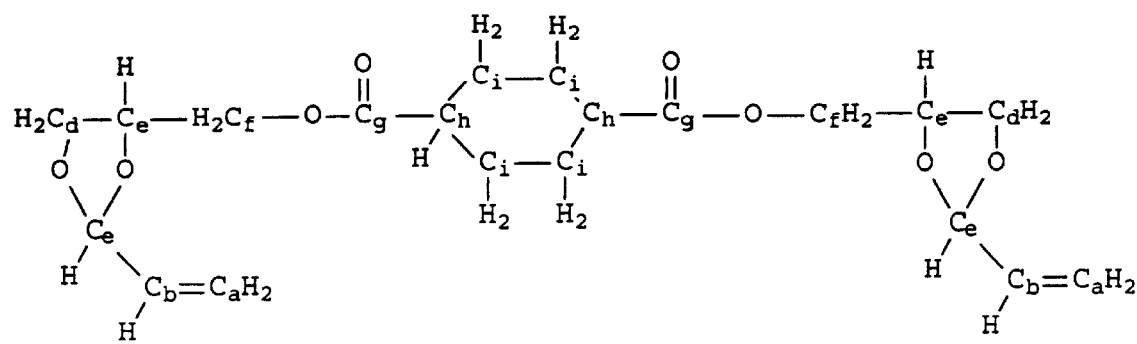
FIG. 7 shows the chemical structure of PEVD prepolymer labeled for NMR analysis.
Figure 8:
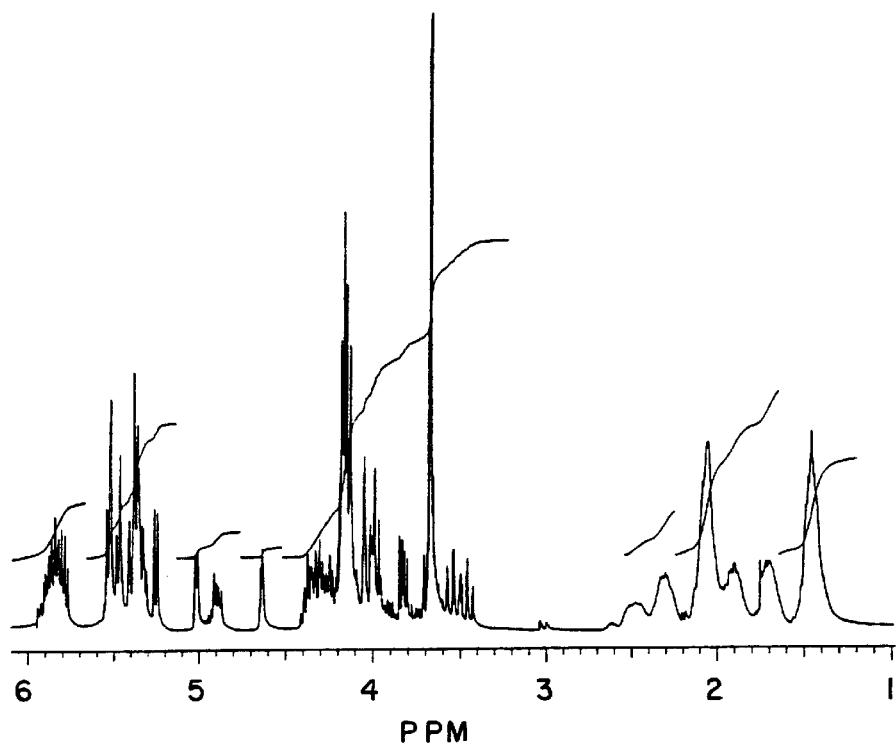
FIG. 8 shows the HNMR spectrum of purified PEVD prepolymer.
Figure 9:
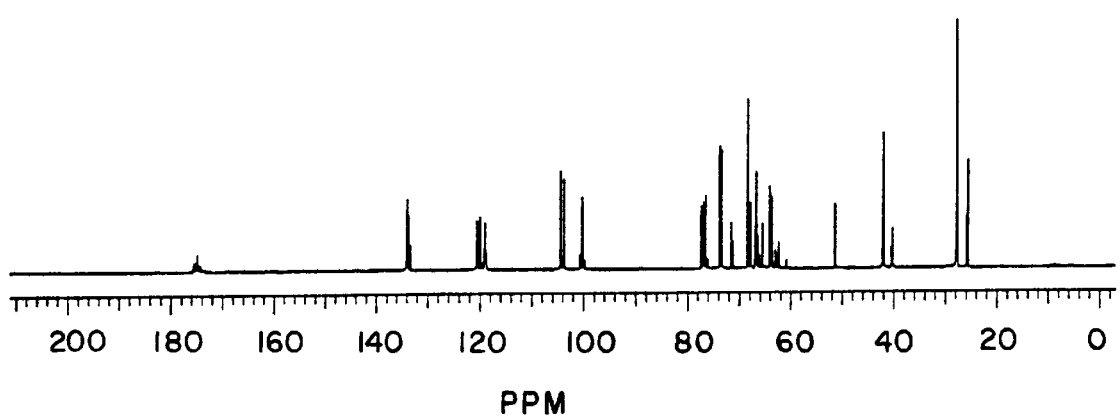
FIG. 9 shows the CNMR spectrum of purified PEVD prepolymer.

$^1$H- and $^{13}$C- nuclear magnetic resonance (NMR) spectroscopy were performed on a sample of the HMVD/cyclohexanedicarboxylate PEVD prepolymer dissolved in deuterated chloroform using a 300 MHz Varian FT-NMR. The spectra are complicated due to the presence of impurities and isomers in both HMVD and dimethyl 1,4-cyclohexanedicarboxylate. Assignment of each absorption peak to a structural unit in the PEVD prepolymer (FIG. 7) was not done. The $^1$HNMR spectrum (FIG. 8) contains numerous absorption peaks which have been separated into regions as listed in Table 2. Comparison of the intensity of the 5.95–5.75 and 5.60–5.29 ppm vinyl group regions (1.5+3.1=4.6 intensity) to that of the 2.70–1.30 ppm C$_1$ region of the cyclohexyl group (eight intensity) suggests not every methoxy group of dimethyl 1,4-cyclohexanedicarboxylate has been replaced by hydroxymethyl vinyl dioxolane groups. This conclusion is supported by the $^{13}$CNMR spectrum of PEVD (FIG. 9) which shows an absorption at 51.4 ppm, a value typical for methoxy esters (Fresenius, W. et al., supra). The presence of ester linkages [—C(O)O—], vinyl groups (H$_2$C=CH—), dioxolane and cyclohexyl ring systems in PEVD is indicated based on the $^{13}$CNMR spectrum as listed in Table 3 (Fresenius, W., et al., supra)). NMR data generally support the proposed chemical structure of PEVD, but also indicate complete replacement of methoxy groups by hydroxymethyl vinyl dioxolane groups has not occurred.

Prepolymer synthesis conditions can be modified, if desired, to obtain more complete conversion to the PEVD prepolymer by altering the reaction conditions, e.g., to increase the activity of the polymer, by removing by-products, and other alterations that will be apparent to the skilled artisan.

TABLE 2

$^1$HNMR spectral data and assignment

| Absorption Peak (ppm) | Experimental Peak Intensity Ratio | Theoretical Peak Intensity Ratio | Assignment |
|---|---|---|---|
| 5.95–5.75 | 1.5 | 2 | H on C$_b$ of vinyl group |
| 5.60–5.29 | 3.1 | 4 | Hs on C$_a$ of vinyl group |
| 5.28–5.23 | 0.5 | — | — |
| 5.04–4.98 | 0.4 | — | — |
| 4.95–4.85 | 0.4 | — | — |
| 4.63 | 0.4 | — | — |
| 4.41–3.40 | 8.1 | — | — |
| 2.70–1.30 | 8.0 | 8 | Hs on C$_i$ of cyclohexyl group |

TABLE 3

$^{13}$CNMR spectral data and assignment

| Absorption Peak (ppm) | Assignment |
|---|---|
| 175.6–174.5 | C$_g$: carbonyl group |
| 134.0–133.5 | C$_b$: carbon of vinyl group |
| 120.7–119.1 | C$_a$: carbon of vinyl group |
| 140.4–99.9 | C$_c$: dioxolane ring carbon |
| 76.1–61.6 | C$_{d,e,f}$: dioxolane ring carbons |
| 51.4 | Carbon of methoxy group |
| 42.3–40.5 | C$_h$: carbons of cyclohexyl group |
| 28.0–25.9 | C$_i$: carbons of cyclohexyl group |

Example 4

PEVD Coating Catalysis Experiments

The PEVD prepolymer must undergo a free-radical cross-linking reaction involving the pendant vinyl groups of neighboring prepolymer molecules in order to form good quality coatings.

Figure 10:
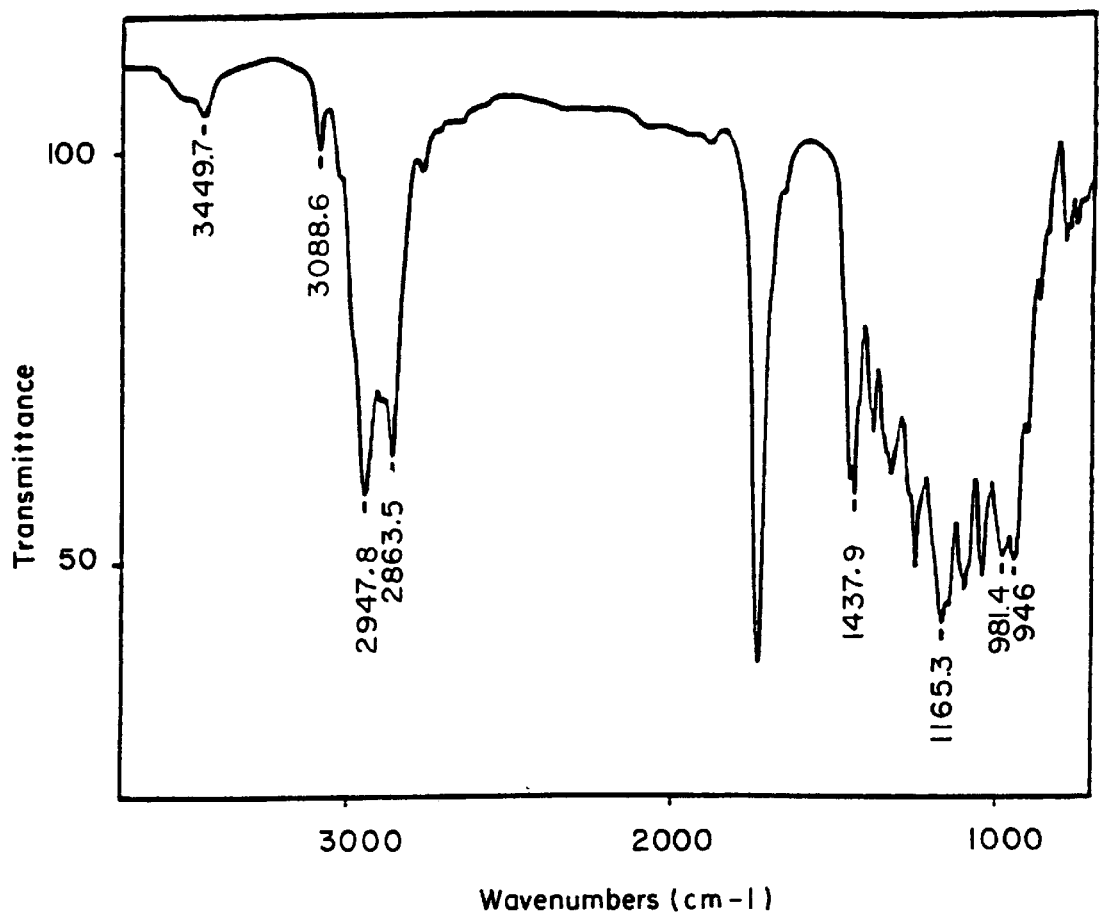
FIG. 10 shows the IR spectum of PEVD prepolymer.
Figure 11:
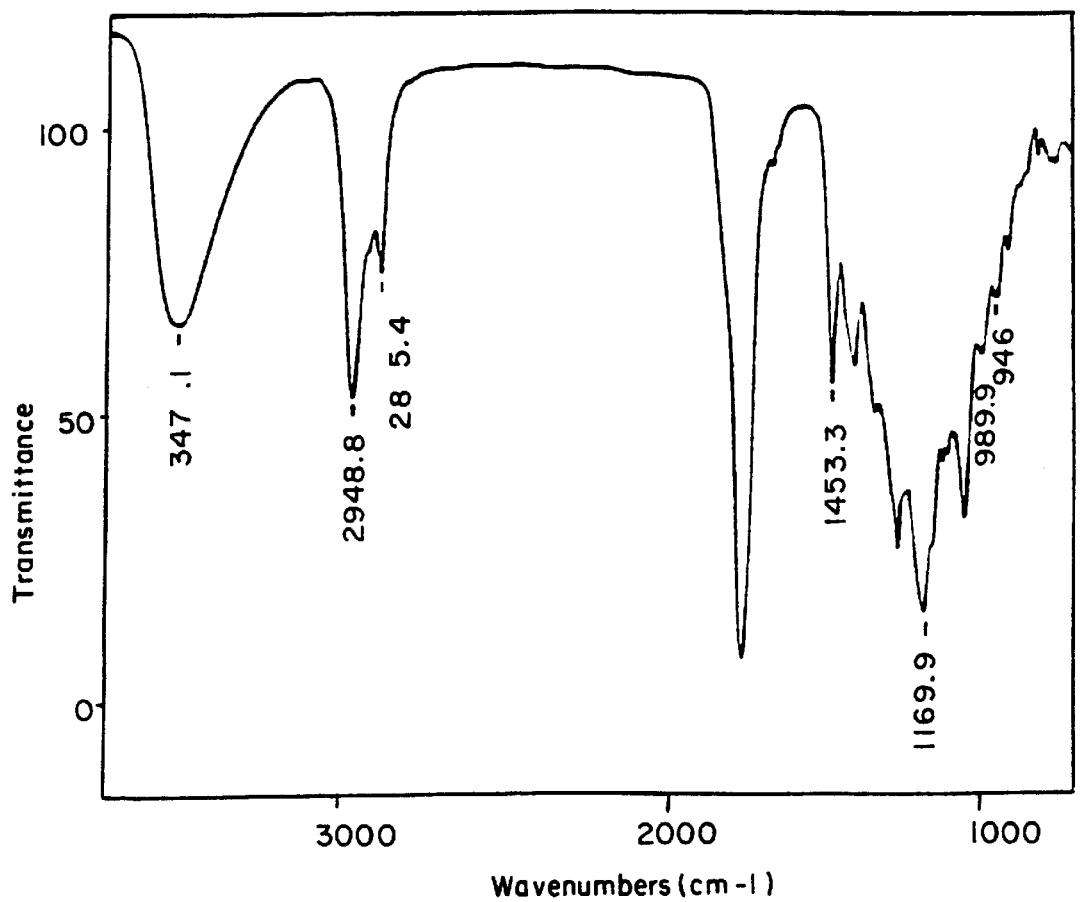
FIG. 11 shows the IR spectra of PEVD prepolymer 9 (no catalyst) after 24 hours at ambient temperature, 50 and 100° C.

Peroxide radicals are generated from the dioxolane group by a ring-opening process due to its interaction with air (O$_2$), catalyst and elevated temperatures. This reaction occurs in the presence of air and without the aid of any catalyst only upon heating coatings at 100° C. for 24 hours. In the PEVD system of the present invention, peroxide generation is accompanied by formation of hydroxyl (—OH) functional groups with the corresponding disappearance of dioxolane rings (—C—O—C—) and the progress of this reaction can be monitored using IR spectroscopy by the appearance of an absorption at approximately 3450 cm$^{-1}$ and decrease in absorptions at 980 and 940 cm$^{-1}$ (Fresenius, W. et al., supra)). Spectral changes that occurred upon heating the PEVD prepolymer at elevated temperatures are shown in FIGS. 10 and 11, with the values and tentative assignments listed in Table 4.

PEVD polymers are formed by the reaction of dioxolane produced peroxide radicals with the pendant vinyl groups, which create cross-links between adjacent prepolymer molecules composed of saturated C—C bonds, allowing the progress of the coating curing (cross-linking) reaction to be monitored using IR spectroscopy by the disappearance of the vinyl (=CH$_2$ $\delta_{ip}$) absorption at 1438 cm$^{-1}$. IR spectroscopy as well as coating appearance was used to monitor the effectiveness of the catalyst on inducing PEVD curing.

Investigations were initially carried out on cobalt, manganese, vanadium and cerium based oxidative polymerization catalysts to determine the effectiveness of each metal based catalyst with respect to curing the PEVD coating compositions of the present invention, as well as their ability to form particle-free coating solutions. The compositions of tested PEVD coating compositions Numbers 1 through 22 and appearance at various stages of formation is set forth in Tables 5 to 8 below.

Manganese, vanadium and cerium at concentrations of 1.0, 0.1 and 0.1 weight % [Formulation Nos. 6, 12 and 14] caused substantial particle formation in the resin (Table 5). Vanadium octoate reportedly has the ability to catalyze the decomposition of peroxides and has been used to accelerate the curing of some unsaturated polyester resins at $\leq 0°$ C. (OMG). However, coatings containing vanadium and dicumylperoxide at concentrations of 0.2 and 1.0 weight % did not fully cure until heated at 100° C. for 24 hours (Formulation No. 13). Manganese at a weight % concentration of 0.5 did not fully cure the PEVD prepolymers tested after 24 hours each at ambient temperatures

TABLE 4

IR spectral changes occurring upon PEVD prepolymer curing at elevated temperatures

| IR Frequency ($cm^{-1}$) | Absorption Peak Intensity | Tentative Assignment of Absorption Peak |
|---|---|---|
| 3476 | Increasing | Formation of hydroxyl (—OH) groups due to dioxolane ring opening |
| 3089 | Decreasing | — |
| 2864 | Decreasing | Relative intensity decreases compared to absorption at 2948 $cm^{-1}$ |
| 1438 | Decreasing | =$CH_2$ $\delta_{ip}$ of pendant vinyl group |
| 1165 | Increasing | — |
| 1097 | Decreasing | — |
| 981 | Decreasing | C—O—C stretch of dioxolane ring system |
| 946 | Decreasing | C—O—C stretch of dioxolane ring system | and 50° C., becoming fully cured only upon heating at 100° C. for 24 hours (Tables 6, 7, and 8). A similar effect was observed for PEVD prepolymers containing no catalyst at all, indicating manganese has an insignificant effect on PEVD curing at this concentration level.

In marked contrast, it was determined that concentrations of cobalt between 0.12 and 1.0 weight % should result in a coating solution capable of being cured upon exposure to temperatures of 50 to 100° C. for 24 hours (Formulation Nos. 3 and 4). Therefore, cobalt, in particular cobalt octoate, is the preferred oxidative polymerization catalyst for the PEVD coating compositions of the present invention.

Investigations were carried out to determine whether reflectance/absorbance IR spectroscopy (RAIR) with a Foster-Miller designed remote probe could effectively be used to monitor coating curing, yielding a simple and quick method to determine catalyst performance without marring coating appearance. Unfortunately, spectral regions below 1000 $cm^{-1}$ cannot be viewed due to the type of optical cable used in the probe and thus any changes in the dioxolane ring system (appearing at 980 and 940 $cm^{-1}$) could not be monitored.

Coating formulations (No. 3 and No. 13) were spread at a thickness of 2 to 3 mils onto chromated aluminum and steel panels in a clean room environment. The panel surface was cleaned with acetone, wiped with a cloth and dried at 100° C. for an hour prior to coating. Coated panels were immediately placed in a low humidity chamber and allowed to dry at ambient temperature for 24 hours with both coatings being incompletely cured at this point. The panels were placed in a preheated static air oven at 50° C. for 24 hours with coating No. 3 curing to a hard surface while coating No. 13 having a thick skin over a fluid resin layer. RAIR spectra for these coatings after the 50° C. cure (Table 9, FIGS. 12, Spectrum B and 13, Spectrum B show significant changes have occurred upon heating (Spectrum B) compared to an unheated PEVD control (Spectrum A). The IR spectrum of coating No. 13 was very similar to that of the control PEVD, except for low intensity absorptions appearing at 1700 and 1635 $cm^{-1}$ in the region normally associated with —C=O stretches. More changes were observed in the spectrum of coating No. 3 upon heating; with significant differences occurring at 1830, 1755, 1630, 1252 and 1209 and 1103 $cm^{-1}$.

The ester [—C(O)O—] group concentration is decreasing based on the reduced intensity of the absorption at 1755 $cm^{-1}$, indicating it is being transformed into another type of group. The disappearance of the absorption at 1252 $cm^{-1}$ may also be linked to the ester decrease because it appears in a spectral region normally associated with the —C—O stretch of esters (1330 to 1050 $cm^{-1}$). Absorptions appear at 1830 and 1630 $cm^{-1}$, indicating new groups are being created, but their identity is unknown due to insufficient data. The absorption at 1463 $cm^{-1}$ was only slightly less intense upon heating, suggesting limited cross-linking of the pendant vinyl groups had occurred, but the coating had cured to a hard surface. A possible explanation for coating cure may be involvement of the transformed ester groups in cross-linking together PEVD molecules.

TABLE 5

Appearance of coating formulation upon mixing of components

| Coating Formulation Number | Coating Formulation Composition (weight %) | Observations |
|---|---|---|
| 1 | 0.024 Cobalt[1] | — |
| 2 | 0.048 Cobalt[2] | — |
| 3 | 0.12 Cobalt[2] | Dark blue solution resulted. |
| 4 | 1.0 Cobalt[2] | Particles precipitated out of initial purplish colored solution after 1 hr. |
| 5 | 0.5 Manganese[3] | Tannish colored solution formed. |
| 6 | 1.0 Manganese[3] | Manganese catalyst agglomerated in resin. |
| 7 | 0.12 Cobalt[2], 1.0 Methylethyl ketone peroxide | Colorless PEVD/peroxide solution developed a brown color, outgassed, and a brown precipitate formed upon addition of cobalt catalyst. |
| 8 | 0.12 Cobalt[2], 0.50 Dimethylaniline | Particles precipitated out of initial purplish colored solution after 1 hr. |
| 9 | 1.0 Cobalt[2], 0.5 Dimethylaniline | Dark blue solution resulted. |
| 10 | 0.12 Cobalt[2], 0.30 2,2'-Bipyridine | Dark tan colored solution containing a small amount of precipitate resulted. |
| 11 | 0.5 Cobalt[2], 0.5 Manganese[3] | Cobalt catalyst formed a solution but agglomeration occurred upon addition of manganese catalyst. |
| 12 | 0.1 Vanadium[4] | Particles precipitated from a solution after 10 min. |
| 13 | 0.02 Vanadium[4], 1.0 Dicumylperoxide | Very light tan colored solution resulted. |
| 14 | 0.1 Cerium[5] | Particles precipitated from a solution after 45 min. |
| 15 | 0.05 Cobalt[2], 0.6 Aluminum[6] | Light reddish colored solution. |

TABLE 5-continued

Appearance of coating formulation upon mixing of components

| Coating Formulation Number | Coating Formulation Composition (weight %) | Observations |
|---|---|---|
| 16 | 0.063 Cobalt[2], 0.6 Aluminum[6] | Light reddish colored solution. |
| 17 | 0.25 Cobalt[2], 0.5 Aluminum[6] | Very small amount of precipitate in a deep blue solution. |
| 18 | 0.5 Cobalt[2], 0.5 Aluminum[6] | Particles precipitated out of initial purplish colored solution after 1 hr. |
| 19 | 0.063 Cobalt[1], 0.6 Aluminum[6], 0.225 Zinc[7] | Light reddish colored solution. |
| 20 | 0.25 Cobalt[2], 0.5 Aluminum[6], 0.1 Zinc[7] | Deep blue colored solution. |
| 21 | 0.25 Cobalt[1], 0.5 Aluminum[6], 0.3 Zinc[7] | Deep blue colored solution. |
| 22 | 0.5 Cobalt[2], 0.5 Aluminum[6], 0.3 Zinc[7] | Very small amount of precipitate in deep purple colored solution. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 6

Appearance of coating upon curing at ambient temperatures for 24 hours

| Coating Formulation Number | Coating Formulation Composition (weight %) | Observations |
|---|---|---|
| Control | — | Resin was fluid. No cure indicated even after 5 days. |
| 1 | 0.024 Cobalt[1] | Resin was fluid. No cure indicated even after 5 days. |
| 2 | 0.048 Cobalt[2] | Resin was fluid. No cure indicated even after 5 days. |
| 3 | 0.12 Cobalt[2] | Coating was fluid. Some areas have skinned over. There is some precipitate present in the coating around which "fisheyes" have formed. |
| 4 | 1.0 Cobalt[2] | Thick skin developed over uncured resin layer. Significant resin curing had occurred. |
| 5 | 0.5 Manganese[3] | Resin was fluid. No cure indicated. |
| 7 | 0.12 Cobalt[2], 1.0 Methylethyl ketone peroxide | Results were similar to formulation No. 3 except there is a greater number of "fisheyes" due to a greater amount of precipitate in the resin. |
| 8 | 0.12 Cobalt[2], 0.50 Dimethylaniline | Resin had thickened and remained evenly coated on substrate surface. No "fisheyes" were observed. Coating was very good in appearance. |
| 9 | 1.0 Cobalt[2], 0.5 Dimethylaniline | Thick skin developed over uncured resin layer. Significant resin curing had occurred. |
| 10 | 0.12 Cobalt[2], 0.30 2,2'-Bipyridine | Resin had thickened and remained evenly coated on substrate surface. No "fisheyes" were observed. Coating was very good in appearance. |
| 13 | 0.02 Vanadium[4], 1.0 Dicumylperoxide | Resin had thickened and remained evenly coated on substrate surface. No "fisheyes" were observed. Coating was very good in appearance. |

TABLE 6-continued

Appearance of coating upon curing at ambient temperatures for 24 hours

| Coating Formulation Number | Coating Formulation Composition (weight %) | Observations |
|---|---|---|
| 15 | 0.05 Cobalt[2], 0.6 Aluminum[6] | Coating was smooth, shiny and tacky to the touch. |
| 16 | 0.063 Cobalt[2], 0.6 Aluminum[6] | Coating was smooth, shiny and tacky to the touch. |
| 17 | 0.25 Cobalt[2], 0.5 Aluminum[6] | Coating was smooth, shiny and glossy. |
| 18 | 0.5 Cobalt[2], 0.5 Aluminum[6] | Thick skin developed over gelatinous resin layer. Coating was very wrinkled. Significant resin curing had occurred. |
| 19 | 0.063 Cobalt[1], 0.6 Aluminum[6], 0.225 Zinc[7] | Coating was smooth, shiny and tacky to the touch. |
| 20 | 0.25 Cobalt[2], 0.5 Aluminum[6], 0.1 Zinc[7] | Coating was smooth, shiny, glossy but tacky to the touch. |
| 21 | 0.25 Cobalt[1], 0.5 Aluminum[6], 0.3 Zinc[7] | Coating had a satin finish, was discolored and opaque. |
| 22 | 0.5 Cobalt[2], 0.5 Aluminum[6], 0.3 Zinc[7] | Coating had a satin finish, was tacky to the touch, opaque and discolored. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 7

Appearance of coating upon additional curing at 50° C. for 24 hours

| Coating Formulation Number | Coating Formulation Composition (weight %) | Observations |
|---|---|---|
| Control | — | Resin was fluid. No cure indicated. |
| 1 | 0.024 Cobalt[1] | Resin was fluid. No cure indicated. |
| 2 | 0.048 Cobalt[2] | Resin was fluid. No cure indicated. |
| 3 | 0.12 Cobalt[2] | Resin had cured to a hard, slightly blue colored coating. |
| 4 | 1.0 Cobalt[2] | Hard/Soft areas on coating. Coating almost fully cured. |
| 5 | 0.5 Manganese[3] | Resin was fluid. No cure indicated. |
| 7 | 0.12 Cobalt[2], 1.0 Methylethyl ketone peroxide | Resin had cured to a hard, shiny coating containing particulates and with some surface wrinkles. |
| 8 | 0.12 Cobalt[2], 0.50 Dimethylaniline | Resin had cured to form a hard and shiny coating. |
| 9 | 1.0 Cobalt[2], 0.5 Dimethylaniline | Hard/Soft areas on coating. Coating almost fully cured. |
| 10 | 0.12 Cobalt[2], 0.30 2,2'-Bipyridine | Resin had cured to form a hard and shiny coating. |
| 13 | 0.02 Vanadium[4], 1.0 Dicumylperoxide | Coating had a thin skin with uncured resin underneath. Resin was not fully cured. |
| 15 | 0.05 Cobalt[2], 0.6 Aluminum[6] | Coating hardness increased but coating could be scratched with a fingernail. |
| 16 | 0.063 Cobalt[2], 0.6 Aluminum[6] | Coating hardness increased but coating could be scratched with a fingernail. |
| 17 | 0.25 Cobalt[2], 0.5 Aluminum[6] | Coating hardness increased but coating could be scratched with a fingernail. |
| 18 | 0.5 Cobalt[2], | Coating hardness increased but |

TABLE 7-continued

Appearance of coating upon additional curing at 50° C. for 24 hours

| Coating Formulation Number | Coating Formulation Composition (weight %) | Observations |
|---|---|---|
| | 0.5 Aluminum[6] | coating could be scratched with a fingernail. |
| 19 | 0.063 Cobalt[1], 0.6 Aluminum[6], 0.225 Zinc[7] | Coating hardness increased but coating could be scratched with a fingernail. |
| 20 | 0.25 Cobalt[2], 0.5 Aluminum[6], 0.1 Zinc[7] | Coating hardness increased but coating could be scratched with a fingernail. |
| 21 | 0.25 Cobalt[1], 0.5 Aluminum[6], 0.3 Zinc[7] | Coating hardness increased but coating could be scratched with a fingernail. |
| 22 | 0.5 Cobalt[2], 0.5 Aluminum[6], 0.3 Zinc[7] | Coating hardness increased but coating could be scratched with a fingernail. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 8

Appearance of coating upon additional curing at 100° C. for 24 hours

| Coating Formulation Number | Coating Formulation Composition (weight %) | Observations |
|---|---|---|
| Control | — | Coating was fully cured. |
| 1 | 0.024 Cobalt[1] | Coating was fully cured. |
| 2 | 0.048 Cobalt[2] | Coating was fully cured. |
| 3 | 0.12 Cobalt[2] | Coating appeared to be hard and shiny, resembling a gloss urethane. Some surface wrinkles can be observed and coating also appears to have contaminants present. |
| 4 | 1.0 Cobalt[2] | Coating was fully cured. |
| 5 | 0.5 Manganese[3] | Coating was fully cured. |
| 7 | 0.12 Cobalt[2], 1.0 Methylethyl ketone peroxide | Coating appeared to be hard and shiny, resembling a semi-gloss urethane. Coating appears to contain contaminates. |
| 8 | 0.12 Cobalt[2], 0.50 Dimethylaniline | Coating was uniform, hard, and shiny. Coating resembled a semi-gloss urethane. |
| 9 | 1.0 Cobalt[2], 0.5 Dimethylaniline | Coating was fully cured. |
| 10 | 0.12 Cobalt[2], 0.30 2,2'-Bipyridine | Resin cured to form a hard and very glossy coating. Coating contained some wrinkles and was yellow in color. |
| 13 | 0.02 Vanadium[4], 1.0 Dicumylperoxide | Resin cured to form a hard surface with a varied surface finish. |
| 15 | 0.05 Cobalt[2], 0.6 Aluminum[6] | Coating hardness increased but still could be scratched with a fingernail. Some coating discoloration observed. |
| 16 | 0.063 Cobalt[2], 0.6 Aluminum[6] | Coating hardness increased but still could be scratched with a fingernail. Some coating discoloration observed. |
| 17 | 0.25 Cobalt[2], 0.5 Aluminum[6] | Coating hardness increased but still could be scratched with a fingernail. Some coating discoloration observed. |
| 18 | 0.5 Cobalt[2], 0.5 Aluminum[6] | Coating hardness increased but still could be scratched with a fingernail. Some coating discoloration observed. |
| 19 | 0.063 Cobalt[1], 0.6 Aluminum[6], 0.225 Zinc[7] | Coating hardness increased but still could be scratched with a fingernail. Some coating discoloration observed. |
| 20 | 0.25 Cobalt[2], 0.5 Aluminum[6], 0.1 Zinc[7] | Coating hardness increased but still could be scratched with a fingernail. Some coating discoloration observed. |
| 21 | 0.25 Cobalt[1], 0.5 Aluminum[6], 0.3 Zinc[7] | Coating hardness increased but still could be scratched with a fingernail. Some coating discoloration observed. |
| 22 | 0.5 Cobalt[2], 0.5 Aluminum[6], 0.3 Zinc[7] | Coating hardness increased but still could be scratched with a fingernail. Some coating discoloration observed. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 9

RAIR spectra changes upon coating curing at 50° C.

| Unheated | Formulations | | | |
|---|---|---|---|---|
| Resin with No Catalyst ($cm^{-1}$) | No. 3 ($cm^{-1}$) | Spectral Observations (Changes Upon Comparing B to A) | No. 13 ($cm^{-1}$) | Spectral Observations (Changes Upon Comparing B to A) |
| 1743 | 1830 | Appeared | 1747 | Similar |
| | 1755 | Significantly less | 1700 | Appeared |
| | 1630 | Appeared | 1635 | Appeared |
| 1440 | 1463 | Slightly less intense | 1458 | Slightly less intense |
| 1381 | 1402 | Slightly less intense | 1404 | Slightly less intense |
| 1325 | 1330 | Slightly less intense | 1327 | Slightly less intense |
| 1282 | 1282 | Similar | 1278 | Slightly more intense |
| 1252 | | Absent | 1256 | Similar |
| 1183 | 1209 | Significantly less | 1205 | Similar |
| 1106 | 1103 | Less intense | 1110 | Similar |
| 1047 and 1040 | 1047 | Similar | 1063 | Similar |

Figure 12:
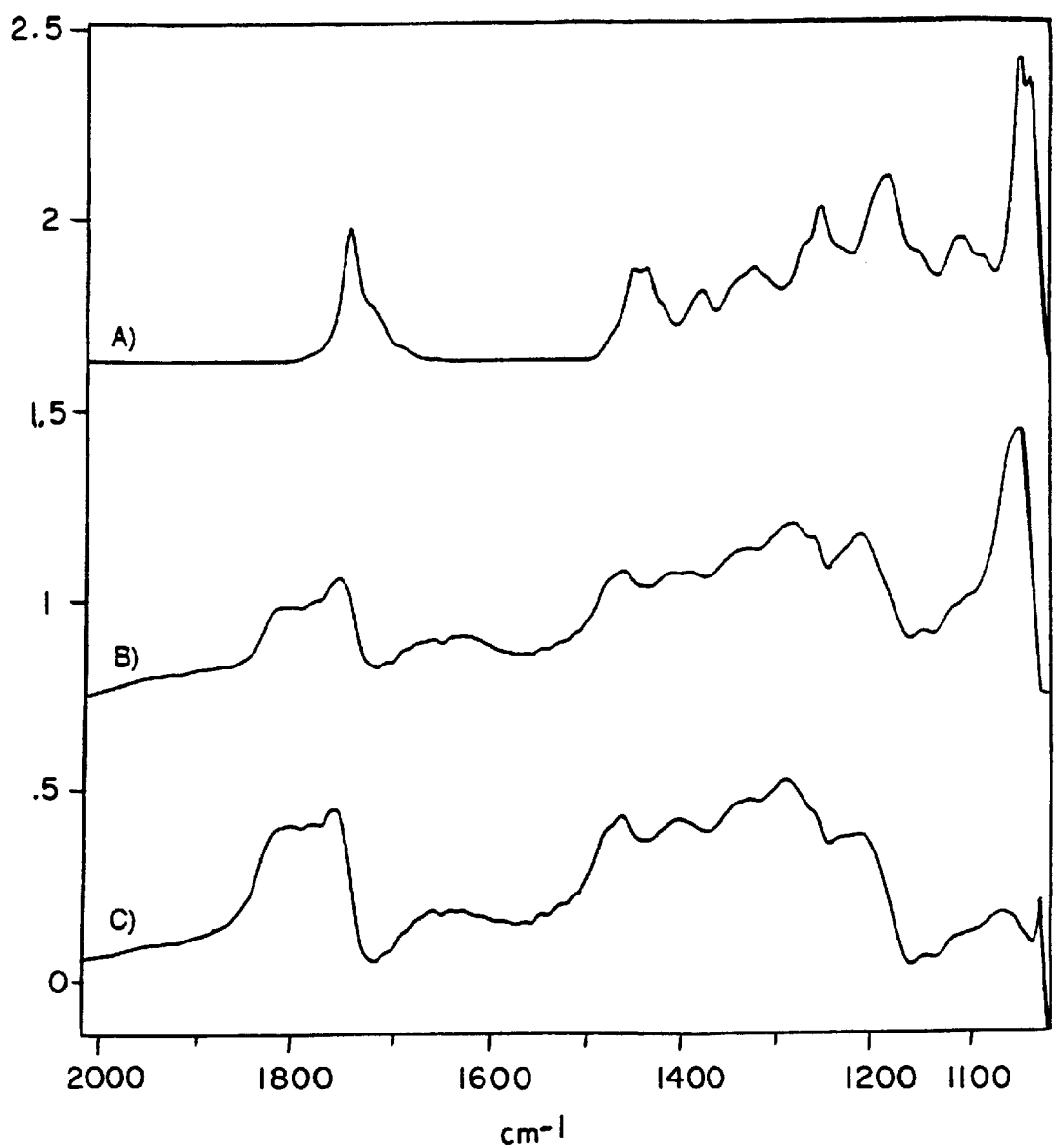
FIG. 12 shows the RAIR spectra of the prepolymer (a) and formulation No. 3 upon heating at 50° C. (b) and 100° C.
Figure 13:
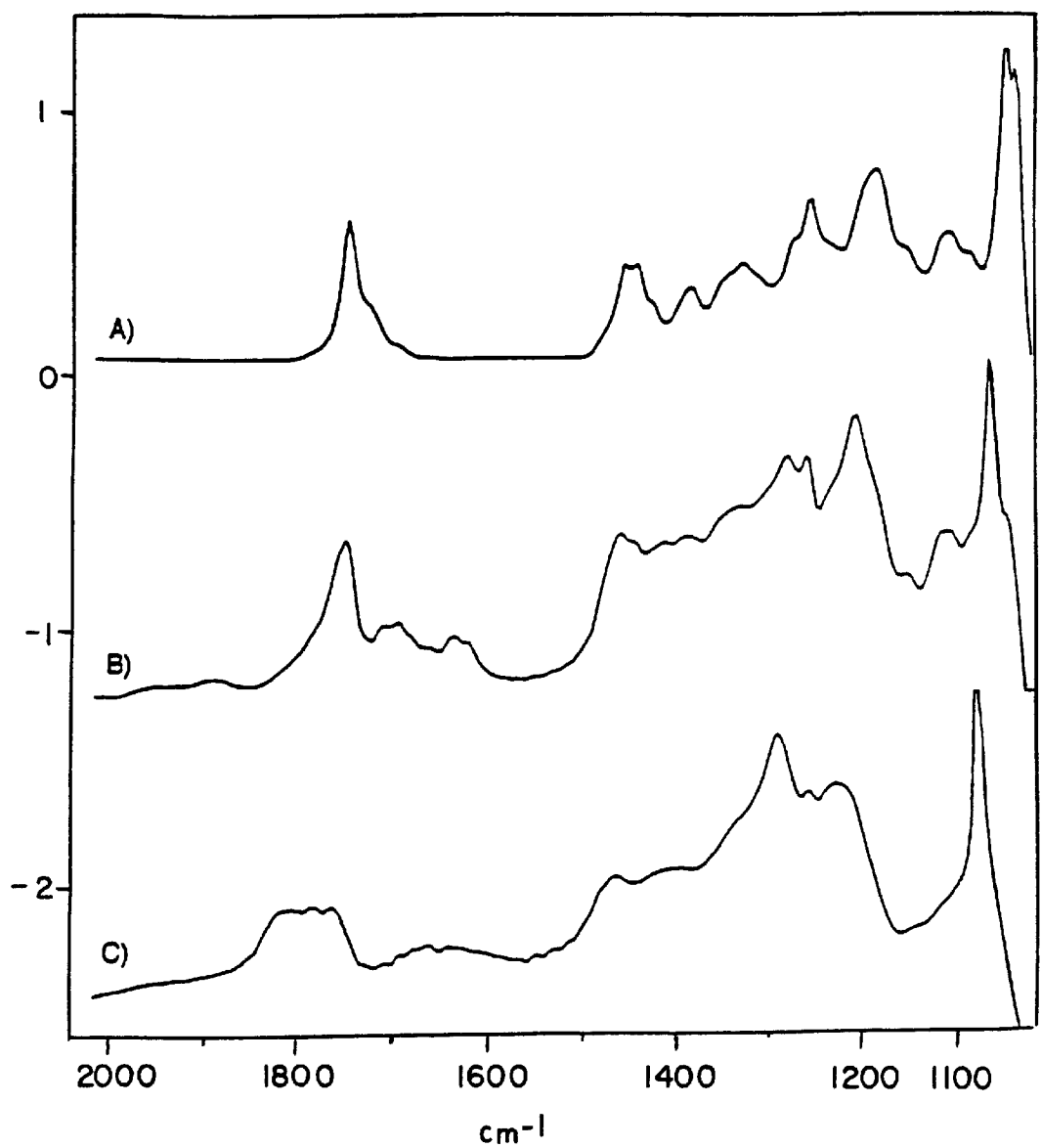
FIG. 13 shows the RAIR spectra of the prepolymer (a) and formulation No. 13 upon heating at 50° C. (b) and 100° C.

Additional changes were observed upon heating these coatings to 100° C. for 24 hours (Table 10, FIGS. 12, Spectrum C and 13, Spectrum C). Coating No. 13 had now cured to a hard surface; with its IR spectrum exhibiting significant changes at 1830, 1750, 1660, 1289, 1226, and 1110 $cm^{-1}$. Absorptions disappeared at 1110 $cm^{-1}$, became significantly less intense at 1750 and 1226 $cm^{-1}$, and appeared at 1830 and 1289 $cm^{-1}$. The spectrum of coating No. 3 was very similar to its previous 50° C. cured one, except for the large decrease in intensity for the absorption at 1063 $cm^{-1}$, located in the spectral region normally associated with the —C—O stretch of esters (1330 to 1050 $cm^{-1}$). The similarity of spectrum C except for the one change suggests one type of curing process may be operating at 50° C. and another becomes active at higher temperatures for the cobalt/PEVD system. Also, the 50° C. curing process may not be cobalt dependent due to similarity in spectral changes upon comparing spectra in FIGS. 12b with 13b and 13c. The cure mechanism(s) operating at various temperatures with different catalyst systems is not fully understood.

In conclusion, PEVD curing can be monitored using RAIR spectroscopy by monitoring changes in absorption intensity at 1830 (increase), 1760 (decrease), 1230 (decrease), 1110 (decrease), and 1060 (decrease) $cm^{-1}$. Assignment of chemical changes in PEVD to these absorptions was not necessary.

TABLE 10

RAIR spectra changes upon coating curing at 100° C.

| Unheated | Formulations | | | |
|---|---|---|---|---|
| Resin with No Catalyst ($cm^{-1}$) | No. 3 ($cm^{-1}$) | Spectral Observations (Changes Upon Comparing B to A) | No. 13 ($cm^{-1}$) | Spectral Observations (Changes Upon Comparing B to A) |
| | 1830 | Similar | 1830 | Appeared |
| 1743 | 1760 | Similar | 1750 | Significantly less intense |
| | | | 1660 | Less intense |
| | 1640 | Similar | 1635 | Appeared |
| 1440 | 1464 | Similar | 1463 | Similar |
| 1381 | 1407 | Similar | 1400 | Similar |
| 1325 | 1330 | Similar | 1330 | Similar |
| 1252 | 1290 | Similar | 1289 | Significantly more intense |
| | | | 1257 | Similar |
| 1183 | 1212 | Slightly less intense | 1226 | Significantly less intense |
| 1106 | 1098 | Similar | 1110 | Absent |
| 1047 and 1040 | 1063 | Significantly less intense | 1081 | Similar |
| | 1027 | Appeared | | |

A free-radical source (methyl ethyl ketone peroxide, No. 7), accelerator (dimethylaniline, No. 8 and No. 9) or chelating agent/accelerator (2,2'-bipyridine, No. 10) were added to PEVD) prepolymer containing cobalt octoate to improve coating curing at near ambient temperatures (Table 5). However, addition of the peroxide or dimethylaniline resulted in extensive particle formation in the resin.

2,2'-bipyridyl addition (OMG's DRi-Rx™) yielded a dark tan colored solution containing a small amount of precipitate which produced coatings exhibiting a viscosity increase and good appearance after 24 hours at ambient temperatures (Table 6), a hard surface after 24 hours at 50° C. (Table 7), but a yellowish and wrinkled surface after 24 hours at 100° C. (Table 8). It is reported (OMG) to form chelated complexes with transition metals such as cobalt, many of which are highly colored. Since 2,2'-bipyridine produced a color it will not be used in the coatings of the present invention which are to be used in topcoat (clear coat in particular) applications requiring smooth and essentially colorless coatings.

Coating formulations (No. 15 through No. 18, Tables 6 to 8, above) containing cobalt and aluminum yielded solutions exhibiting no or minimal particle formation with cobalt concentrations of 0.05 to 0.25 weight %, but substantial particles formed with a cobalt concentration of 0.5. Formulations No. 15 and No. 16, Tables 6 to 8 above, yielded smooth and shiny coatings that were tacky to the touch after 24 hours at ambient temperatures. However, similar coatings containing only cobalt were fluid in appearance (No. 2, Tables 6 to 8 above), indicating aluminum has a pronounced effect of coating cure. Coatings from No. 17, Tables 6 to 8 above, under the same conditions were smooth and shiny in addition to being tack-free, suggesting additional curing had occurred. Too rapid a surface curing occurred at ambient temperatures with coating No. 18, Tables 6 to 8 above, as evidenced by the formation of a wrinkled thick skin over a gelatinous inner layer. Additional heating of all these coatings at elevated temperatures resulting in addition curing of the coatings to hard surfaces. Thus, the addition of a through drier, particularly an aluminum-based through drier, to the PEVD coating compositions of the present invention is beneficial due to the increased extent of coating cure at near ambient temperatures.

Cobalt induced particle formation and coating skinning was reduced in the coating compositions of the present invention by the use of a cobalt activity mediators.

Particle formation occurred in resins containing cobalt at a weight % concentration of 1.0, but the resulting coatings exhibited substantial cure at ambient temperatures, forming a thick skin over a liquid resin layer (formulation No. 4, Tables 6 to 8 above). These coatings were almost fully cured after heating at 50° C. for 24 hours and were totally cured after 24 hours at 100° C.

Various combinations of zinc-based cobalt activity mediators with cobalt and an aluminum-based through drier were investigated for their combined effect on particle formation and near ambient temperature coating cure (formulations No. 19 through No. 22, Tables 6 to 8 above). The zinc-based cobalt activity mediator was used at weight % concentrations of 0.1 to 0.3. Substantially higher zinc concentrations were not tested due to the possibility of reducing cobalt activity to the point of preventing coating cure.

Zinc addition reduced the extent of particle formation in the resin. This was seen by comparing formulations No. 18 with No. 22 and No. 17 with No. 20 and No. 21 of Table 5. Coatings No. 21 and No. 22 had a satin finish, were tacky to the touch and opaque as well as discolored after curing at ambient temperatures for 24 hr; indicating zinc at a concentration of 0.3 weight % resulted in deterioration of coating appearance. Both coatings No. 19 and No. 20 were smooth, shiny and tacky to the touch under similar conditions, with coating No. 20 exhibiting slightly harder properties. All of these coatings underwent additional curing at elevated temperatures to a hard surface. MEK wipe and pencil hardness tests indicated coating No. 20 was the most fully cured of the coatings examined. Based on these results and those of Tables 5 through 8, coating formulation No. 20 was evaluated to produce the best quality coatings at ambient or elevated temperatures and was selected for large scale test evaluations.

TABLE 11

Coating composition of formulation No. 20

| Coating Formulation No. 20 | Weight % Concentration |
|---|---|
| Cobal Metal | 0.25 |
| Aluminum Metal | 0.50 |
| Zinc Metal | 0.10 |
| Combined Catalyst Organic Components | 8.51 |
| PEVD Prepolymer | 90.64 |

TABLE 12

Calculated versus actual catalyst concentration in coatings produced from formulation No. 20

| Catalysts in Coating Formulation No. 20 | Calculated Weight % Concentration in Formulation | Actual Weight % Concentration in Coating |
|---|---|---|
| Cobalt metal | 0.25 | 0.26 |
| Aluminum metal | 0.50 | 0.46 |
| Zinc metal | 0.10 | 0.12 |

Analysis for cobalt/aluminum/zinc in a filtered sample of coating formulation No. 20 was performed to confirm catalyst concentrations in the coating actually applied to the substrate (Table 12). This sample had undergone curing for 24 hours each at ambient temperatures, 50 and 100° C. Results indicate the concentration of metals in the coating formulation is the same as that of the coating thus no metals were removed by the filtration process.

Example 5

PEVD Hand-Coating Experiments

HMVD/cyclohexanedicarboxylate PEVD prepolymer (800 g) was synthesized and purified according to procedures discussed above and in Examples 1 and 2 below and used in coating formulation 20 was formed as follows. The appropriate amount of aluminum (AOC 1020X) was added to the purified PEVD prepolymer under an inert atmosphere such that a concentration of 0.50 weight % aluminum metal was obtained and the mixture stirred until a solution resulted. Zinc (Zinc Hex-Chem, OMG) was then added in similar manner at a concentration of 0.10 weight % zinc metal, followed by Catalyst 510 at 0.25 weight % cobalt metal. The resulting purple colored solution was static degassed (bubbles allowed to rise to the surface and break) and filtered through a 5 µm A/E glass fiber mat to remove a small amount of precipitate just prior to coating application.

Two separate coating experiments were carried out using coating formulation No. 20 applied to steel panels and steel panels which had undergone zinc phosphate, electrocoat (BSASF Electrocoat ED214), and priming (red primer, U28 series) processes at an automotive manufacturing facility.

Coating formulations were applied to either "yellow chromated" 2024-T3 aluminum alloy or SAE 1010 steel panels, with the majority of the coatings being evaluated on steel panels. The panel surface to be coated was cleaned and dried prior to coating application as listed in Table 13.

Kapton tape (2 to 3 mils thick) was adhered to the clean/dried panel surface so as to create a rectangular container into which the coating formulation was poured. A Teflon coated doctor blade was then moved over the resin filled container to remove any excess coating solution and the coated panel was placed on a leveled surface inside a low humidity chamber, with relative humidities generally ≦15 percent, located in a clean room for 24 hours before post-curing at elevated temperatures.

TABLE 13

Substrate cleaning procedures prior to coating application

| Substrate Type | Cleaning Procedure |
|---|---|
| "Yellow Chromated" 2024-T3 Aluminum Alloy | 1. Acetone wiped and dried for an hour at 100° C. |
| Low Carbon, Cold-Rolled | 1. Acetone wiped and dried for an hour at 80° to 100° C. |
| SAE 1010 Steel | 2. Acetone wiped, degreased using Oakite Low Heat Cleaner 3 at 80° C. for 10 min, rinsed with water, and either dried for an hour at 100° C. or deoxidized using Oakite 31 at ambient temperatures for 5 min followed by rinsing and drying. |

Use of the low humidity chamber allowed the very small amount of residual solvents from the catalyst solutions to slowly evaporate and the coatings partially cure to a firm but slightly tacky surface without absorption of moisture from the surrounding air. Moisture absorption by the coating prior to curing is believed to be fairly low due to the nature of the HMVD/cyclohexanedicarboxylate PEVD and thus not present any problems to coating curing, but steps were taken to minimize moisture exposure. Allowing any residual solvent to evaporate and the coatings to partially cure before exposure to elevated temperatures should assure consolidation of the coating solution into a good quality coating.

Coated panels were further cured on leveled shelves in a forced-air oven, with panels removed from the elevated temperature curing schedule as specified in Table 15 below. A total of 75 coated steel panels and 24 coated steel/zinc phosphated/electrocoated/primed panels were produced during the Phase I program and the coatings evaluated according to methods listed in Table 14.

TABLE 14

Coating evaluation tests

| Test Method | Description of Test | Test Location |
|---|---|---|
| Extent of coating cure by IR and RAIR spectroscopy | Monitor changes in IR spectrum with time at temperature | Foster-Miller |
| Pencil hardness | ASTM D3363: resistance of coating to penetration by pencil points of varying hardness | Foster-Miller NAWC Deft, Inc. |
| Coating smoothness and uniformity | Appearance of coating surface, uniformity of coverage and evidence of particle formation | Foster-Miller |
| Color | Appearance of color in the coating or changes in color upon exposure to elevated temperatures | Foster-Miller Deft, Inc. |
| Gloss | Type of coating finish: glossy, dull or matted | Foster-Miller Deft, Inc. |
| Dry tape cross-hatch adhesion | ASTM D3359: resistance of coating to delamination | Foster-Miller NAWC Deft, Inc. |

TABLE 14-continued

Coating evaluation tests

| Test Method | Description of Test | Test Location |
|---|---|---|
| Wet tape cross-hatch adhesion | Resistance of coating to delamination after exposure to water at ambient temperatures for 24 hr | NAWC Deft, Inc. |
| Scrape adhesion | ASTM D2197: resistance of coating to penetration by a probe with a fixed applied force | NAWC Deft, Inc. |
| MEK wipe resistance | ASTM D5402: resistance of coating to 25 "double rubs" of a cloth saturated with MEK | Foster-Miller NAWC Deft, Inc. |
| Water resistance | ASTM D870: resistance of a coating to softening, blistering or other upon immersion in water at ambient temperatures for 24 hr | Foster-Miller NAWC Deft, Inc. |

Example 6

PEVD Coating Evaluation

HMVD/cyclohexanedicarboxylate PEVD coatings prepared in Example 6 and cured under the various conditions listed in Table 15 were evaluated for MEK resistance, pencil hardness, cross-hatch dry tape adhesion, water resistance, gloss and color at Foster-Miller. Coated steel panels were originally produced for evaluation of coating physical properties such as hardness, gloss, color, etc. and not for adhesion testing. Adhesive properties of the HMVD/cyclohexanedicarboxylate PEVD coating to the substrate was evaluated only using primed panels because this surface will be similar to those encountered in actual use as a topcoat or clearcoat. Both types of coated specimens were also sent to Mr. Dan Bernard of Deft, Inc. and Mr. Anthony Eng of the Naval Air Warfare Center (NAWC) for independent evaluation.

The solvent resistance of coatings No. 20 applied to primed panels were measured upon exposure to methyl ethyl ketone (MEK) as specified in ASTM D5402. Changes in coating appearance and thickness were measured after 25 double rubs (Table 16). Initial PEVD coating thicknesses were measured to be 3 mils using profilometry techniquest and no detectable changes in thickness occurred upon MEK exposure. Coatings cured to 100° C. were not affected at all by MEK and passed the test. The 75° C. cured coatings showed a very slight tendency to be affected and marginally passed the test. However, coatings cured to 50° C. were degraded upon MEK exposure and were deemed to fail the test.

TABLE 15

Curing schedule for coated steel panels

| Panel Type | No of Panels Cured 24 hr at Ambient Temps | No of Panels Cured 24 hr each at Ambient and 50° C. | No of Panels Cured 24 hr each at Ambient, 50 and 75° C. | No of Panels Cured 24 hr each at Ambient, 50, 75 and 100° C. | No of Panels Cured 24 hr each at Ambient, 50 and 100° C. |
|---|---|---|---|---|---|
| Steel | 25 | 25 | — | — | 25 |
| Steel with combined zinc phosphated, electrocoated and primed surface | — | 8 | 8 | 8 | — |

TABLE 16

MEK resistance of coatings No. 20 on primed steel panels

| | Observations after 25 Double Rubs |
|---|---|
| Coatings cured to 50° C. | Coating became very cloudy and degraded slightly. Coating thickness remained constant. |
| Coatings cured to 75° C. | Coating became slightly cloudy in some areas, but did not degrade. Coating thickness remained constant. |
| Coatings cured to 100° C. | Coating had a slight hint of cloudiness in some areas, but there were no signs of degradation. Coating thickness remained constant. |

Both the gouge and scratch hardness of coatings from formulation No. 20 applied to primed panels were measured according to ASTM D3359. Pencils of decreasing hardness were held at a 45 degree angle to the coated panel, were firmly pressed against the coating, and then smoothly moved away from the operator with any coating damage being noted (Table 17). All three coatings exhibited a gouge hardness of 3H. However, differences in coating curing were observed upon comparison of scratch hardness data, with values lying midpoint in this method's hardness scale. Coatings cured to 75° C. resisted scratching better than 100° C. cured coatings, which were more scratch resistant than the 50° C. cured coatings.

The adhesion of coatings from formulation No. 20 to primed surfaces was measured according to ASTM D3359. A square grid was cut through the coatings down to the metal substrate. The grid was cleaned using a soft brush, tape was then applied to the grid center, the tape pressed firmly against the surface with the eraser end of a pencil to ensure good contact, and the tape smoothly removed within 90 sec of application. The grid area was inspected for coating removal and classification of the test results was done as recommended in the ASTM method. Two adhesion tests were performed on each panel with the results listed in Table 18. Both the 75 and 100° C. cured coatings exhibited excellent adhesion to the red primer (U28 series), passing the test. However, the 50° C. cured coating failed the test due to extensive coating removal.

Water immersion testing of coatings applied to primed panels was carried out by immersing the coated panels in stirred deionized water at ambient temperatures for up to seven days (ASTM D 870). Panels were briefly removed from the water each day, examined and the coating appearance graded according to the system used in "A Methodology for Evaluating the Total Performance of Coatings and Coating Systems" (Simaskaki, M. and Hegedus, C. R., "A Methodology for Evaluating the Total Performance of Coatings and Coating Systems", *J. Coatings Technology* 1993, 51–58). Test results (Table 19) show all coatings developed in cloudy appearance after 24 hours immersion, with the 50° C. cured coating surprisingly exhibiting a less pronounced effect. Coatings cured at temperatures ≧75° C. adhered strongly to the substrate while the 50° C. cured coatings could easily be removed from the substrate.

TABLE 17

Pencil hardness of coatings No. 20 on primed steel panels

| Pencil Hardness in Decreasing Order | Coatings Cured to 50° C. | Coatings Cured to 75° C. | Coatings Cured to 100° C. |
|---|---|---|---|
| 6H (hardest) | Film was gouged | Film was gouged | Film was gouged |
| 5H | Film was gouged | Film was gouged | Film was gouged |
| 4H | Film was gouged | Film was gouged | Film was gouged |
| 3H | Film was not gouged | Film was not gouged | Film was not gouged |
| 2H | Film was scratched | Film was scratched | Film was scratched |
| H | Film was scratched | Film was scratched | Film was scratched |
| F | Film was scratched | No scratches | Film was scratched |
| HB | Film was scratched | | No scratches |
| B (softest) Coating Hardness | No scratches | | |

TABLE 17-continued

Pencil hardness of coatings No. 20 on primed steel panels

| Pencil Hardness in Decreasing Order | Coatings Cured to 50° C. | Coatings Cured to 75° C. | Coatings Cured to 100° C. |
|---|---|---|---|
| Results | | | |
| Gouge | 3H | 3H | 3H |
| Scratch | B | F | HB |

TABLE 18

Adhesion tape test results for coating No. 20 on primed steel panels

| | Results |
|---|---|
| Coatings cured to 50° C. | OB, OB: Greater than 65% of grid area showed flaking or coating detachment. |
| Coatings cured to 75° C. | 5B, 5B: The edges of the cuts are completely smooth and none of the lattice squares in the grid area is detached. |
| Coatings cured to 100° C. | 5B, 5B: The edges of the cuts are completely smooth and none of the lattice squares in the grid area is detached. |

Coating appearance as a function of ultimate cure temperature was also investigated. All three coatings exhibited a similar visual level of gloss. However, a slight yellow tint in the 100° C. cured coating was observed, suggesting the cure temperature and/or time should be reduced since coatings should be clear and colorless to be used in clearcoat applications.

TABLE 19

Water immersion testing of coatings No. 20 on primed steel panels

| | Coating Appearance After | | | | | | |
|---|---|---|---|---|---|---|---|
| | 1 Day Immersion | 2 Day Immersion | 3 Day Immersion | 4 Day Immersion | 5 Day Immersion | 6 Day Immersion | 7 Day Immersion |
| Coatings Cured to 50° C. | Coating became cloudy (bp[1]) | Coating appears the same, no change (bp) | Coating appears the same, no change (bp) | Coating appears the same and has softened (bf[2]) | No change in coating appearance (bf) | Coating has become opaque (bf) | Coating has become opaque (bf) |
| Coatings Cured to 75° C. | Coating became cloudy (bp) | Coating appears the same, no change (bp) | Coating appears the same, no change (bp) | Coating appears the same and has softened (bf) | No change in coating appearance (bf) | No change in coating appearance (bf) | No change in coating appearance (bf) |
| Coatings Cured to 100° C. | Coating became cloudy (bp) | Coating appears the same, no change (bp) | Coating appears the same, no change (bp) | Coating appears the same and has softened (bf) | No change in coating appearance (bf) | No change in coating appearance (bf) | No change in coating appearance (bf) |

[1]Designation bp signifies borderline pass due to coating exhibiting slight softening and/or color change
[2]Designation bf signifies borderline fail due to coating exhibiting irreversible softening and/or significant color change Based on the test results, coating cure temperatures ≧75° C. provided fully cured PEVD coatings from formulation No. 20. Water immersion, gloss, adhesion tape test and gouge hardness results indicate the 75 and 100° C. cured coatings performed in a similar manner. The 100° C. cured coating exhibited slightly better MEK resistance, but was slightly less scratch resistant than coatings cured to 75° C. However, development of a slight yellow color was observed on heating coatings at 100° C. These results indicate that coatings from formulation No. 20 cured at 75° C. for 24 hours or at ≦100° C. for ≦24 hours results in improved appearance and performance.

The present invention has been described in detail, including the preferred embodiments thereof. However, it will be appreciated that those skilled in the art, upon consideration of the present disclosure, may make modifications and/or improvements on this invention still within the scope and spirit of this invention as set forth in the following claims.

What is claimed:

1. A polyester coating composition containing essentially no volatile organic components, the composition comprising:
   (a) at least one prepolymer which comprises the reaction product of
      (i) at least one substituted vinyl dioxolane monomer having the formula

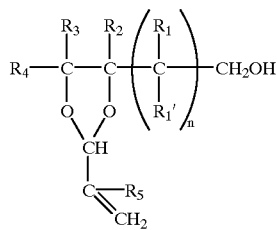

wherein $R_1$ and $R_1'$ are independently hydrogen or an alkyl group having from 1 to 10 carbon atoms, n is a number from 0 to about 10, and $R_2$, $R_3$, $R_4$, and $R_5$ are independently hydrogen or an alkyl group having from 1 to about 10 carbon atoms; and
      (ii) at least one ester of a polycarboxylic acid; and
   (b) a catalyst system comprising cobalt, aluminum and zinc to initiate polymerization of the prepolymer of step (a) to form a coating.

2. A coating composition according to claim 1, further comprising a peroxide initiator.

3. A coating composition according to claim 2, wherein the peroxide initiator comprises dibenzoyl peroxide or methyl ethyl ketone peroxide.

4. A coating composition according to claim 1, further comprising a solubility enhancer.

5. A coating composition according to claim 4, wherein the solubility enhancer comprises dimethylaniline.

6. A coating composition according to claim 1, wherein the catalyst system comprises cobalt at up to about 1.0% by weight, zinc at up to about 0.5% by weight and aluminum at up to about 0.6% by weight.

7. A coating composition according to claim 6, wherein cobalt is present at from about 0.01 to about 0.5% weight %, aluminum is present at from about 0.01 to about 0.6 weight %, and zinc is present at from about 0.01 to about 0.5 weight %.

8. A coating composition according to claim 1, wherein the catalyst system comprises no more than about 1.5% by weight.

9. A coating composition according to claim 2, wherein the peroxide initiator is present from about 0.1 to about 5.0 weight %.

10. A coating composition according to claim 4, wherein the solubility enhancer is present at from about 0.1 to about 1.0 weight %.

11. A coating composition according to claim 1, wherein the substituted vinyl dioxolane monomer is 2-vinyl-4-hydroxymethyl-1,3-dioxolane (HMVD) or 2-vinyl-4-hydroxybutyl-1,3-dioxolane (HBVD) or a blend thereof.

12. A coating composition according to claim 1, wherein the substituted vinyl dioxolane monomer is HBVD or HMVD and the ester is dimethyl adipate or dimethyl 1,4-cyclohexanedicarboxalate.

13. A coating composition according to claim 1, wherein the coating composition is sprayable.

14. A coating composition according to claim 1, further comprising at least one reactive diluent.

15. A coating composition according to claim 14, wherein the reactive diluent comprises a vinyl group containing composition.

16. A coating composition according to claim 15, wherein the reactive diluent comprises trimethyl propane triacrylate.

17. A coating composition according to claim 14, wherein the reactive diluent comprises at least one substituted vinyl dioxolane monomer having the formula:

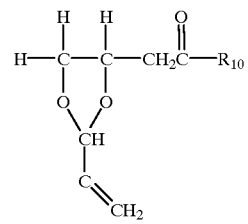

wherein $R_{10}$ is a branched or unbranched, saturated or unsaturated alkyl or alkoxy aliphatic group having from 1 to about 10 carbon atoms.

18. A coating composition according to claim 17, wherein $R_{10}$ further comprises at least one urethane, ester, or amide linkage.

19. A coating composition according to claim 17, wherein the reactive diluent is HMVD or HBVD or a blend thereof.

20. A coating composition according to claim 14, wherein the reactive diluent comprises an ester.

21. The polyester coating composition of claim 1, wherein the ester of the polycarboxylic acid comprises, at least one ester of a polycarboxylic acid having the formula:

wherein $R_6$ is a branched or unbranched, saturated or unsaturated, alkyl or alkoxy group having from 1 to about 20 carbon atoms or a cyclic alkyl group having from 1 to about 20 carbon atoms; and $R_7$ and $R_8$ are the same or independently selected from —$CH_3$ or an alkyl group having up to about 10 carbon atoms; and $R_9$ is —H or is a branched or unbranched alkyl or alkoxy group having from 1 to about 20 carbon atoms or a cyclic alkyl group having from 1 to about 10 carbon atoms.

22. A coating composition according to claim 21, wherein $R_6$ comprises at least one amide linkage.

* * * * *